United States Patent [19]

Shaw et al.

[11] Patent Number: 4,792,207
[45] Date of Patent: * Dec. 20, 1988

[54] SINGLE MODE FIBER OPTIC SINGLE SIDEBAND MODULATOR AND METHOD OF FREQUENCY SHIFTING USING SAME

[75] Inventors: Herbert J. Shaw, Stanford; Robert C. Youngquist; Janet L. Brooks, both of Mountain View, all of Calif.

[73] Assignee: The Board of Trustees of the Leland Stanford Junior University, Stanford, Calif.

[*] Notice: The portion of the term of this patent subsequent to Aug. 4, 2004 has been disclaimed.

[21] Appl. No.: 50,762

[22] Filed: May 15, 1987

Related U.S. Application Data

[62] Division of Ser. No. 556,636, Nov. 30, 1983, Pat. No. 4,684,215.

[51] Int. Cl.$^4$ .......................... G02B 6/02; G02B 5/30; G02F 1/11
[52] U.S. Cl. .................. 350/96.29; 350/96.15; 350/96.13; 350/96.14; 350/96.30; 350/371; 350/358; 350/320
[58] Field of Search ............... 350/96.10, 96.11, 96.12, 350/96.13, 96.14, 96.15, 96.16, 96.29, 96.30, 358, 320, 370, 371, 374, 384, 389

[56] References Cited

U.S. PATENT DOCUMENTS

| | | | |
|---|---|---|---|
| 3,406,358 | 10/1968 | Seidel et al. | 350/96.29 |
| 3,625,589 | 12/1971 | Snitzer | 350/371 |
| 3,645,603 | 2/1972 | Smith | 350/371 |
| 3,931,518 | 1/1976 | Miller | 350/96.15 |
| 4,268,116 | 5/1981 | Schmadel et al. | 350/96.29 |
| 4,312,562 | 1/1982 | Segawa et al. | 350/96.29 |
| 4,319,186 | 3/1982 | Kingsley | 350/962.9 X |
| 4,449,210 | 5/1984 | Myer | 350/96.29 X |
| 4,493,528 | 1/1985 | Shaw et al. | 350/96.15 |
| 4,536,058 | 8/1985 | Shaw et al. | 350/320 |
| 4,589,728 | 5/1986 | Dyott et al. | 350/96.30 |
| 4,615,582 | 10/1986 | Lefevre et al. | 350/96.29 |
| 4,684,215 | 8/1987 | Shaw et al. | 350/96.29 |
| 4,735,485 | 4/1988 | Shaw et al. | 350/96.29 |

FOREIGN PATENT DOCUMENTS

| | | | |
|---|---|---|---|
| 533418 | 3/1981 | Australia | 350/96.15 X |
| 3006102 | 8/1980 | Fed. Rep. of Germany | 350/96.15 |
| 3013335 | 10/1981 | Fed. Rep. of Germany | 350/96.15 |
| 57-1586616 | 9/1982 | Japan | 350/96.15 |

OTHER PUBLICATIONS

Youngquist et al., "Birefringent-Fiber Polarization Coupler", Optics Lett., vol. 8, No. 12, 12/83, pp. 656-658.

Kingston et al., "Broad Band Guided Wave Optical Frequency . . . Bragg Array", *Applied Physics Letters*, vol. 42, No. 9, May 1, 1983.

Gfeller, "Electroacoustic Transducers . . . ", *IBM Tech. Disc. Bull.*, vol. 21, No. 2, 7/78, pp. 813-814.

Ohashi et al., "Phase-Matched Light Amplification . . . ", *Applied Physics Letters*, vol. 41, No. 12, 12/82, pp. 1111-1113.

Kitayama et al., "Stress-Induced Frequency Tuning . . . ", *Applied Physics Letters*, vol. 41, No. 4, 8/82, pp. 322-324.

(List continued on next page.)

*Primary Examiner*—William L. Sikes
*Assistant Examiner*—Brian M. Healy
*Attorney, Agent, or Firm*—Knobbe, Martens, Olson & Bear

[57] ABSTRACT

A fiber optic frequency shifter comprising two waveguides having different indices of refraction. In some embodiments the waveguides are two modes of propagation in one fiber. Plural distributed coupling ridges, or electrodes mounted adjacent piezoelectric materials, are independently driven to apply sinusoidally varying forces to the fiber. In some embodiments, the phase relationship of the driving signals for the electrodes or ridges is such that a travelling acoustic wave is launched in the fiber. In other embodiments, regions of stress in the fiber are created by an acoustic wave coupled into the fiber from a transducer coupled to an acoustic medium surrounding the fiber. The input carrier light is shifted in frequency by the frequency of the acoustic wave.

3 Claims, 14 Drawing Sheets

U.S. PATENT DOCUMENTS

Risk et al., "Single-Sideband Frequency Shifting in Birefringent Optical Fiber", SPIE '84.

Gfeller et al., "Modulator and Tap for Optical Fiber Systems", *IBM Technical Disclosure Bulletin*, vol. 21, No. 5, Oct. 1978.

Nosu et al., "Acoustooptic Phase Modulator for Single Mode Fibers", 47th Int'l. Conf. on Integrated Optics . . . Tokyo, Paper 28C3-5.

Nosu et al., "Acousto-Optic Frequency Shifter for Single Mode Fibers", *Electronic Letters*, vol. 19, No. 20, pp. 816-818, 9/29/83.

Fraser et al., "The Design of Efficient Broadband Wedge Transducer", *Applied Physics Letters*, vol. 32, No. 11, Jun. 1, 1978, pp. 698-700.

Lardat et al., "Applications of Edge Bonded Transducers to Saw Components", *Proceeding of the IEEE*, vol. 64, No. 5, May 1976, pp. 627-630.

Cook et al., "Surface Waves and Ultrasonic Frequencies", *ASTM Bulletin*, (TP127), May 1954, pp. 81-84.

Heisman et al., "Integrated-Optical Single-Sideband . . . Shifter", *IEEE J. of Quantum Electronics*, vol. QE-18, No. 4, Apr. 1982, pp. 767-771.

Ulrich et al., "Single-Mode Fiber-Optical Polarization Rotator", *Applied Optics*, vol. 18, No. 11, Jun. 1, 1979, pp. 1857-1861.

Yariv, "Coupled-Mode Theory for Guided-Wave Optics", *IEEE Journal of Quantum Electronics, vol. QE-9, Sep. 1973, pp. 919-933.*

Chinone et al., "Elasto-Optic Polarization Measurement in Optical Fiber", *Optics Letters*, vol. 6, No. 1, Jan. 1981, pp. 16-18.

Miller, "On Solutions for Two Waves with Periodic Coupling", *The Bell System Technical Journal*, Oct. 1968, pp. 1801-1822.

Katsuyama, "Single-Mode Propagation in 2-Mode Region of Optical Fibre by Using Mode Filter", *Electronics Letters*, vol. 15, 1979, pp. 442-444.

Harris et al., "Acousto-Optic Tunable Filter", *J. of Optical Society of America*, vol. 59, No. 6, Jun. 1969, pp. 744-747.

Alferness et al., "Waveguide Electro-Optic Polarization Transformer", *Applied Physics Letters*, vol. 38, No. 9, May 1, 1981, pp. 655-657.

Alferness et al., "Tunable Electro-Optic Waveguide . . . Filter", *Applied Physics Letters*, vol. 40, No. 10, 15 May 1982, pp. 861-862.

Goto et al., "Optical Switching Characteristics . . . Acoustic Waves", *Transactions of the IECE of Japan*, vol. E66, No. 7, Jul. 1983, pp. 442-449, Tokyo.

Jeunhommet et al., "Directional Coupler for Multimode Optical Fibers", *Applied Physics Letters*, vol. 29, No. 8, 15 Oct. 1976, pp. 485-487.

Heismann et al., "Integrated-Optical Single-Sideband . . . ", IEEE Transactions on Microwave Theory and Techniques, vol. MIT-30, No. 4, Apr. 1982, pp. 613-617.

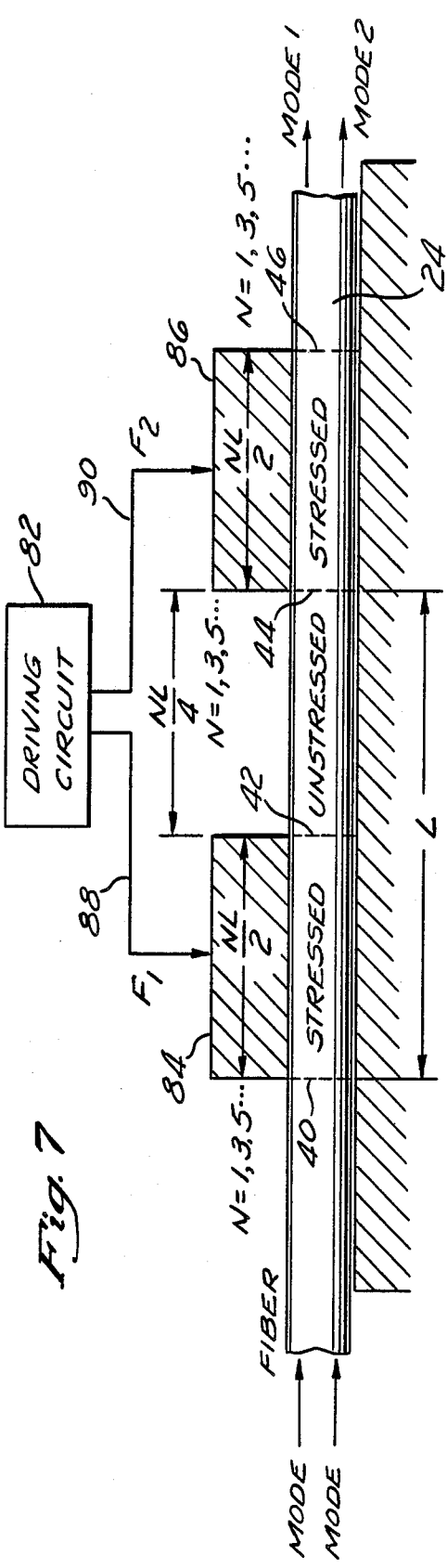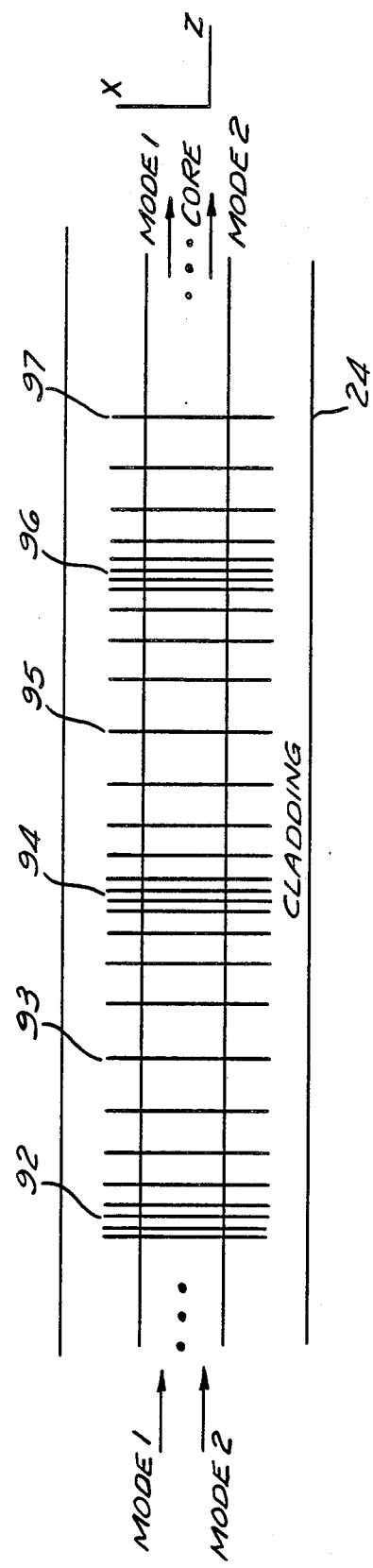

SINGLE MODE FIBER OPTIC SINGLE SIDEBAND MODULATOR AND METHOD OF FREQUENCY SHIFTING USING SAME

This application is a division of application Ser. No. 556,636, filed Nov. 30, 1983, now U.S. Pat. No. 4,684,215.

BACKGROUND OF THE INVENTION

The invention relates to the field of fiber optic sensors and modulators. More particularly, the invention relates to the field of frequency shifters for fiber optic systems.

It has long been known that light from a moving source will be shifted in frequency because of the Doppler effect. The change in frequency or wavelength is a function of the relative velocity of the source and observer. The wavelength will become shorter and the frequency high when the source is moving toward the observer, and vice versa.

It has also been known that the wavelength of light will be changed upon reflection from a moving mirror. The moving mirror adds to the energy content of the impinging photon thereby increasing the frequency of the light. This phenomenon is discussed by Meyer-Arendt in "Introduction to Classical and Modern Optics", Prentice Hall (1972) at pages 539–540.

The Doppler effect principle and hetrodyning effects have been used in bulk optics to cause frequency shifts in light waves reflected from wavefronts of acoustic waves propagating through optically transparent bulk media. The areas of compression and rarification caused by the travelling acoustic wave change the index of refraction in the bulk media such that incoming light impinging obliquely on the wavefronts is partially reflected and partially refracted. The movement of the wavefronts causes a Doppler shift in the reflected and refracted light similar to the effect of a moving mirror.

A single sideband modulator for producing phase, or frequency shift in integrated optic waveguides was taught by Heisman & Ulrich in "Integrated Optical Single Sideband Modulator and Phase Shifter", IEEE Journal of Quantum Electronics, Vol. QE-18, No. 4, April 1982 at pp. 767–771. A scheme of spatially weighted coupling points between two waveguide modes was mathematically proposed, and a physical implementation was taught for a bulk optic strip waveguide diffused into an X-cut $LiNbO_3$ waveguide. The coupling between two modes in this birefringent crystal was implemented by use of pairs of interdigital electrodes spaced at $\frac{1}{4}$ of the beat length. Each electrode had a width of $\frac{1}{4}$ beat length or an integer multiple thereof. The electric fields under the edges of the electrodes caused coupling by the electro-optic effect found in crystals. The electrodes were driven by driving voltages which were 90 degrees out of phase to simulate a travelling wave of off diagonal polarizability. The frequency shift was caused by forward light scattering at the moving perturbation comparable to Bragg reflection at a travelling acoustic wave.

The integrated optic device described above has the advantage that the amount of frequency shift is limited only by the upper frequency of the driving signals. However, it has the extreme disadvantage that it cannot be easily used in fiber optic systems because of the complications of aligning and coupling the integrated optic waveguide to the fiber of the host system. Such difficulties render the device undesirable for use in fiber optic systems where in-line devices fabricated on the fiber of the host system alleviate the need for complicated coupling apparatus which is troublesome to install and properly align.

Further, integrated optic devices are very lossy by the nature of their construction. Integrated optic waveguides are made by diffusing impurities such as titanium into single crystal structures to form a strip. These diffused waveguides are lossy for several reasons. First, the presence of impurities causes absorption and scattering losses. These losses are on the order of decibels per centimeter. Further, integrated optic waveguides are subject to an index changing phenomenon called the "photorefractive effect". The effect stems from the fact that when a large amount of optical power is concentrated in a small area of a crystal, the optical electromagnetic field becomes so strong that it pushes electrons in the crystal structure away from the waveguide area. This causes the index of the waveguide to vary such that the waveguide is no longer monomode thereby rendering the device inoperative.

A further disadvantage of integrated optic waveguides is that they are difficult to make. Monomode waveguides have cores on the order of 10 microns or less in diameter. Because diffusion of impurities into a crystal is necessary, and the geometries are very small, complex integrated circuit techniques must be used. First, a mask must be made, and then complicated and expensive equipment must be used to lay down layers of photo-resist and to diffuse the impurities into the crystal. Further, precise registration of the mask must be maintained to insure the correct alignment for the electrode fingers and the diffused waveguide. These additional complications render integrated optic devices undesirable for use in fiber optic systems.

An in-line acousto-optic frequency shifter was taught by Nosu, et al in "Acousto-Optic Frequency Shifter For Single Mode Fibers" first published at the 47th International Conference on Integrated Optics and Optical Fiber Communications Conference in Tokyo, June 27–30, 1983. A birefringent monomode fiber was mounted in two oil filled PZT cylinders with their respective leading edges spaced $\frac{3}{4}$ of a beat length apart. PZT, as is well known to those skilled in the art, changes its dimensions when an electric field is applied to it. The fiber was placed in a capillary tube filled with mineral oil, and the capillary tube was placed in the PZT cylinder in an off-axis position. The PZT cylinder was filled with mineral oil. A standing pressure wave in each cylinder resulted when the PZT cylinders were excited with sinusoidal excitation signals phased 90° apart causing elasto-optic coupling. This elasto-optic coupling between the polarization modes of the fiber in one cavity caused sidebands above and below the optical carrier. The other cavity generated one sideband that was in phase and another that was out of phase with the sidebands created by the first cavity such that one sideband was strengthened and the other was cancelled.

The frequency shift in the Nosu et al device above was caused by the excitation of moving acoustic waves in the fiber by the PZT cylinders. Each cylinder established two acoustic waves moving in opposite directions. The opposite directions of travel caused the upper and lower sidebands to occur.

Because the PZT oil filled chambers were mechanically weakly coupled to the fiber, not much power was transferred between modes by the two drums. Further, the drums were huge, rendering the device too large for effective use in many practical fiber optic devices. If enough of these drums were used such that a large amount of power was transferred between the two modes, the resulting device would be quite unwieldy and generally impractical for use in a fiber optic system.

Accordingly, a need has arisen for a fiber optic frequency shifter which is compact in size, and which can be fabricated on the fiber of a monomode, fiber optic system. The system should be able to couple from 0 to 100% of the input power from one mode to another mode at a shifted frequency which is exactly equal to the modulating signal with as few harmonics as possible.

SUMMARY OF THE INVENTION

The invention is an apparatus and method of shifting light at a carrier frequency which is propagating in a fiber optic waveguide into another mode of propagation at a new frequency which is shifted in frequency from the carrier frequency by the frequency of a modulating signal. In the broader aspect, the apparatus consists of a fiber optic waveguide which can support at least two modes of propagation, each with a different index of refraction. The fiber optic waveguide can be birefringent monomode fiber, single crystal fiber, non-birefringent, monomode fiber which is operated at a wavelength which can support odd and even modes, or multimode fiber. A distributed set of coupling elements which are driven by modulation driving signals which are phased in a predetermined manner cause coupling between two of the modes. If the phases of the driving signals are properly matched to the separation of the coupling elements and the frequency of the modulation signal is at a resonant frequency, an apparent acoustic wave will be generated in the fiber by simulating the wave at sampling points located at the coupling elements. The acoustic wave should have a wavelength which matches the beat length of the fiber. In other embodiments an active acoustic wave is launched in the fiber carrying the carrier light.

The method of shifting the frequency of light comprises introducing light at a carrier frequency into one mode of a fiber optic wave guide which is capable of guiding at least two modes each having a different index of refraction. A real or apparent travelling acoustic wave is then introduced into the fiber having a wavelength which is equal to the beat length. The acoustic wave creates periodic time varying stresses in the fibers which causes the input light to be coupled from one mode to the other, and causes the coupled light to be frequency shifted relative to the input light.

BRIEF DESCRIPTION OF THE DRAWINGS

FIG. 7 is a drawing of the structure for an embodiment of a fiber optic structure utilizing a modified version of the coupler of FIG. 1 as a frequency shifter.

FIG. 8 is a schematic representation of the stress caused by an acoustic wave travelling through a fiber.

DETAILED DESCRIPTION OF THE PREFERRED EMBODIMENT

Figure 1:
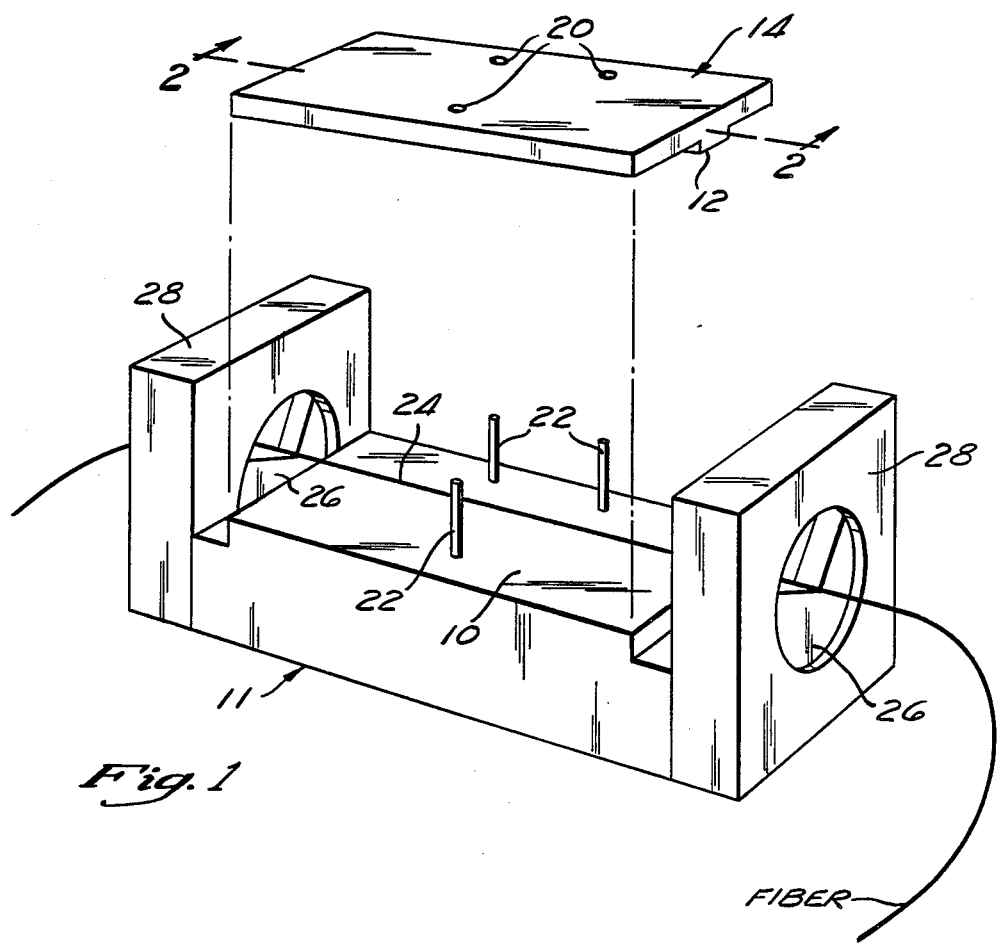
FIG. 1 is an exploded, perspective view of a narrowband directional coupler.

FIG. 1 shows the apparatus of a narrowband polarization coupler in which a polished, flat surface 10 is machined on a metal or plastic block 11. The surface 10 should be smooth and flat to within a few microns. The surface 10 serves as the first of two surfaces between which an optical fiber waveguide is squeezed.

Figure 2:
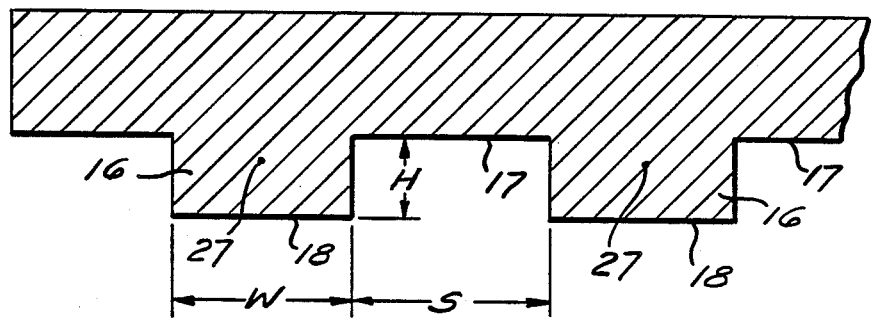
FIG. 2 is a cross section along the section line 2—2 in FIG. 1 showing the shape of the ridges.

The second surface is a multiple ridge region 12 machined on the under surface of a second block 14. As discussed hereinafter, the ridges 12 provide coupling elements which, when pressed against the fiber, stress the fiber to cause light to be coupled between the modes. Referring momentarily to FIG. 2 there is shown a cross section of the ridged region 12 in which a plurality of ridges 16 are formed. The ridges 16 are formed by machining the block 14 to provide spaced, parallel notches or grooves 17, such that there is formed a plurality of polished ridge surfaces 18 having a width W and a separation S between the edges of adjacent ridges. To obtain maximum coupling for a given force exerted on the fiber, the width W between the edges of each ridge should be one half the beat length of the fiber for light at the particular frequency which is utilized.

Beat length, L, is related to the fact that, in optical fibers, light travels at different velocities in different polarization modes, yielding an optical path length difference between the modes. This causes the phase of light in one mode to shift continuously relative to the phase of light travelling in the other mode. Thus, two components of a light wave which start in phase but which travel in different polarization modes in monomode birefringent fiber will slowly separate in phase. The "beat length" of the fiber is the distance required for the light component in one mode to separate in phase relative to the light component in the other mode by 360 degrees, at which time the two components will again be in phase. Thus, one beat length will have been travelled when the two components have shifted in phase by 360°. After travelling one half of a beat length, the two components will be separated by 180 degrees or $\pi/2$ radians.

In the preferred embodiment, the separation distance S at the ridges equals their width W as depicted in FIG. 2, but any odd multiple of one-half beat length may also be used for the dimensions W and S. That is, each ridge can be any odd multiple of one-half beat length, and each separation can be any odd multiple of one-half beat length. The cross section of the notches 17 is rectangular, because that is the easiest shape to machine. However, this shape is not critical; any shape which yields a flat surface 18 on the ridges 16 with a width W of an odd multiple of one-half beat length and edge separations of an odd multiple of one-half beat length will be satisfactory, provided the height H of the notch 17 is sufficient to maintain stress when the material of the ridge 16 is deformed by the application of stress to a fiber.

The block 14 is made of a hard plastic, Deltrin ™. This plastic deforms more readily than glass; thus, when the ridges are pressed onto glass fiber the ridges have been found to deform a small amount. For the required amount of pressure to cause complete power transfer, it is preferable that the ridges not deform so much as to flatten the block 14 such that stress is uniformly exerted all along the fiber. It is critical that there be periodic regions of stress and no stress in the fiber. Each of these regions should be an exact odd multiple of one-half beat length in width for maximum efficiency in coupling. Incomplete power transfer will result if this geometry is not achieved, but some coupling may still occur depending upon the exact geometry and force applied.

It has been found that a deformable plastic is preferable to metal for the ridges 16, because a metal ridge will not deform as much when pressure is applied thereby creating the danger of breaking the fiber. Deformability of the ridge lessens this danger.

Returning to FIG. 1, the block 14 has a plurality of holes 20 which are spaced in a pattern to receive a set of pins 22 projecting from the flat surface 10 in a matching pattern. The block 14 may be slid toward and away from the flat surface 10 along the pins 22. The pins are so aligned that the edges of ridges 16 are transverse to the longitudinal axis of a fiber 24 which is held on the flat surface 10 by a pair of fiber holding plates 26. Thus, the longitudinal axes of the ridges 16, illustrated by reference numeral 27 in FIG. 2, are transverse to the longitudinal axis of the fiber 24. The pins 22 also serve to prevent rocking of the block 14 to prevent uneven pressure from being applied to the fiber 24.

The fiber holding plates 26 are rotatable relative to the flat surface 10 by virtue of being mounted in a pair of circular apertures formed in a pair of end plates 28. The holding plates are rotatable to allow the fiber to be rotated such that one of the principal axes of birefringence in the fiber can be oriented at an angle, preferably 45°, to the direction of the applied force exerted by the ridges 16. This will be explained in more detail below. The angle 45° is preferred, because maximum shifting of the axes of birefringence for a given force is obtained at that angle. The end plates 28 are mounted to the block 11, at the ends thereof, so that the plates 28 are perpendicular to the flat surface 10.

Referring to FIGS. 3(a)–3(g), there is shown a diagram of the stress regions in the fiber 24 when the block 14 is pressed down with a total force F, so that the fiber 24 is squeezed between the surfaces 18 of the ridges and the surface 10 of the lower block. Also shown in FIGS. 3(b)–3(g) are vector diagrams of the amount of optical power on each of the axes of birefringence, i.e., polarization modes, at various points along the fiber. Referring also to FIG. 4, there is shown a diagram of how the axes of birefringence of the fiber 24 are changed by the application of stress. Those skilled in the art will understand that a single mode birefringent fiber, such as the fiber 24, has two orthogonal axes of polarization which correspond to the two orthogonal polarization modes of a single mode fiber.

FIG. 3(a) shows three regions of alternating stress and no stress caused by two of the ridges 16. Each of the stressed regions 30 and 32 is one-half beat length long in this embodiment. The same is true for the unstressed region 34. The fiber 24 can be thought of as a four-port device analogous to a directional coupler coupling dissimilar waveguides. For example, the two orthogonal X and Y polarization modes of the fiber 24, shown schematically at 36, are analogous to the two input ports of such a directional coupler. Similarly, the X and Y orthogonal polarization modes, shown schematically at 38, are analogous to the output ports of such a directional coupler.

When stress is applied to the fiber 24, as represented by the force F in FIG. 4 pushing the surface 18 against the birefringent fiber 24, it was found that the orthogonal axes of polarization X and Y (which correspond to the polarization modes X and Y) abruptly shifted through an angle Theta to the orthogonal axis of polarization X' and Y'. This abrupt shift was quite unexpected, since it was believed that stress applied by the surfaces 18 would deform the fiber 24 so as to perturb the axes of polarization over a longer region than the width W of the surface 18 applying the stress. This would tend to cause a gradual shift in the orientation of the axes of polarization over a relatively long boundary region rather than an abrupt shift at the edges of the surfaces 18 of the ridges 16. Such a gradual rotation of the axes of polarization over a relatively long distance would not cause a significant power transfer, i.e., coupling between the polarization modes, because the resultant polarization vector would merely follow the gradual shift in the axes of polarization, and substantially maintain its position relative thereto without breaking up into components on new axes.

It is important to the operation of the device that abrupt changes in the orientation of the polarization mode axes be caused so that such changes in orientation occur over a very short boundary region. In the embodiment shown, these boundaries, represented by the dotted lines 40, 42, 44, 46 in FIG. 3(a) are formed by the edges of the ridge areas 16, and thus, are periodically spaced at one-half the beat length. In other embodiments, the boundaries could be spaced at odd multiples of the beat length. Since these boundaries function to couple light between the modes of the fiber, they will be referred to herein as "coupling locations", or "coupling points".

FIGS. 3(b)-3(g) show how these abrupt boundaries 40, 42, 44 and 46 in the fiber 24 cause power transfer. The electric field vector for the X-polarization mode (which corresponds to the X axis of polarization in a birefringent fiber) is labeled X in the unstressed region 34, and X' in the stressed regions 30, 32. Similarly, the electric field vector for Y-polarization mode (which corresponds to the Y-axis of polarization) is labeled Y in the unstressed region 34, and Y' in the stressed regions 30, 32. It will be understood that the X and X' vectors (FIGS. 3(b)–(g)), correspond to the X and X' axes (FIG. 4) of polarization, respectively, and the Y and Y' vectors (FIGS. 3(b)–(g)) correspond to the Y and Y' axes (FIG. 4) of polarization, respectively.

In FIG. 3(b) the input light is represented by the vector 48 as entering the fiber 24 with all power in the X polarization mode. This polarization is maintained as the light propagates up to the boundary 40 at the beginning of the first stressed region 30.

FIG. 3(c) shows the power components after the light has propagated just beyond the boundary 40 into the stressed region 30. At the boundary 40, the axes of polarization X and Y abruptly shift through an angle Theta (FIG. 4) to a new orientation X' and Y', as discussed above in reference to FIG. 4. These new polarization mode axes X' and Y' represent the orientations of the electric field vectors for the electromagnetic light waves traveling in these polarization modes. As in the X and Y orientation case, the light in the X' mode travels at a different velocity than the light in the Y' mode, since that is fundamental to the concept of birefringence. The overall polarization of the light then is the resultant vector based upon the components of power in the X' and Y' or X and Y axes.

It will be noted that in the stressed region 30, there first appears at the boundary 40 a component of power in the Y' polarization mode whereas before the boundary 40 there was no power in the Y mode. The reason for this stems from Maxwell's equations which are well known mathematical relationships which explain the behavior of electromagnetic fields at boundaries. A fundamental principle is that, at an abrupt boundary through which an electromagnetic field passes, the orientation and magnitude of the electric field vector, relative to a fixed observer, must be the same on either side of the boundary. In this case, the resultant polarization, i.e., the orientation of the electric field vector to the left of the boundary 40 is as shown by the vector 48 in FIG. 3(h). To the right of the boundary 40, the polarization axes X' and Y' are shifted so that to maintain the resultant polarization for the vector 48, there must be a small Y' component because X' is shifted from its orientation in the X mode. Thus some power is transferred from the X mode into the Y' mode at the boundary 40.

As the two Y' and X' components travel through the stressed region 30 they shift in relative phase by 180 degrees because the stressed region is one half a beat length long. The relative phase of the X' and Y' components at the left of the boundary 42 is as shown in FIG. 3(d). The 180 degree phase shift is modeled by reversing the direction of the Y' component. The same result would be obtained if the 180° phase shift was modeled by reversing the direction of the X or X' vector and leaving the Y or Y' vector unchanged. As a consequence of this 180° phase shift, the resultant polarization vector 50 is shifted from the orientation of the vector 48.

At the boundary 42, the orientation of the polarization axes X' and Y' abruptly shifts back to the original orientation X and Y by virtue of the removal of stress. As the light travels across the boundary 42, the polarization represented by the vector 50 must be preserved. The situation to the right of the boundary 42, at the beginning of the region 34, is as shown in FIG. 3(e). However, because the shifting of the axes of polarization cause a concomitant shift in the direction of the component vectors representing power in the X and Y modes, the magnitude of the X and Y components must change to preserve the angle and magnitude of the overall electric field vector 50. By comparing FIGS. 3(b) and 3(e), it will be noted that the regions 30, 34 have caused a substantial increase in the magnitude of the Y component of power.

FIG. 3(f) represents the power components just to the left of the boundary 44 ending the unstressed region 34. The unstressed region 34 is also one-half beat length long and thus there will be another 180° phase shift between the X and Y components as they travel through the region 34. This phase shift is again modeled by reversing the direction of the Y component at the boundary 44, as shown in FIG. 3(f). By extension of the above discussion, it is apparent that the polarization axes will shift abruptly again at the boundary 44, from the X and Y orientation, back to the X' and Y' orientation (FIG. 4). This causes more power to be shifted into the Y' polarization mode, and it can be seen from FIG. 3(g) depicting the situation just right of the boundary 44, that to preserve the magnitude and angle of the resultant electric field vector 52 across the boundary 44, the magnitude of the Y' component in FIG. 3(g) must increase because of the shift in the angles of the X and Y axes to X' and Y'. Thus, it is seen that each boundary at an odd multiple of one-half beat length causes a certain amount of power to be coupled from one mode to the other. The power coupled at the boundaries 40,42,44,46 is additive, so that total amount of coupled power from one end of the fiber 24 to the other is cumulative. If the boundaries were other than at exact odd multiples of one-half beat length, the cumulative coupled power might still be non zero, but each boundary at other than an odd multiple might cause power to be coupled into the other mode which has a component which is out of phase with the power already coupled into the other mode. This out of phase coupled power would cancel some of the power already coupled. Whether the net coupled power was non zero would depend upon the exact locations of the boundaries and how much force was applied in each stressed region. In general, however, errors on the order of 5–10% in the location of the boundaries may be tolerated without having a substantial adverse effect on the operation of the device.

The system can be characterized mathematically as follows. Typically, for highly birefringent fiber, light propagating down one of the axes will not couple appreciably to the other axis. It has been demonstrated that an additional birefringence can be induced by applying pressure to the fiber. This birefringence is given by $$\Delta n_p = (an^3 Cf/2d) \tag{1}$$

where a is a constant equal to 1.58 for round fiber, n is the mean refractive index of the fiber, C is a piezo-optical coefficient, f is the force per unit length applied to the fiber and d is the fiber cladding diameter. In calculations, the values $n=1.46$, $C=5\times10^{-12}$ (MKS), and $d=65$ μm were used. For small forces the additional birefringence can be treated as a perturbation to the fiber's normal birefringence. For the purpose of analysis it is assumed that the applied force is at 45° to the fiber axes of birefringence. Applying the force at an angle of 45° to an axis of birefringence causes the maximum shift in the orientation of the birefringence axes per unit force. However, the angle is not critical and deviations from 45° can be adjusted for by increasing the applied force. The first order result of the perturbation of birefringence is rotation of the fiber's original axes of birefringence through a small angle. This small shift in birefringence does not significantly change the magnitude of the total fiber birefringence, $\Delta n$. The angle $\theta$ is given by $$\theta \sim \sin(\theta) = \left[ \frac{\Delta n_p^2}{2(\Delta n_p^2 + \Delta n^2 + \sqrt{2}\,\Delta n \Delta n_p)} \right]^{\frac{1}{2}} \approx \tag{2}$$

The total birefringence, $\Delta n$, is assumed to be constant with wavelength; it can be measured by directly observing the beat length $L=\lambda/(\Delta n)$ of the fiber at a known vacuum wavelength, $\lambda$. The fiber used in the preferred embodiment had a measured $\Delta n=7.4\times10^{-4}$.

Light originally polarized along the X axis will decompose into components polarized along the axes X' and Y' when entering a squeezed region. The relative phase of the light in the two polarizations will change by $\pi$ radians in half a beat length. If at this distance the force on the fiber is removed, the light will decompose back into components along the original axes with an amount $\cos^2(2\theta)$ in the X polarization and $\sin^2(2\theta)$ in the Y polarization. After traveling another L/2 distance, i.e., half a beat length, the proper phase relationship in the two axes will be established such that a second stressed region will cause further power transfer. For a single L/2 length stressed region and L/2 unstressed region, a Jones matrix, T, can be written to describe the amplitude polarization transformation of this structure $$T = \begin{bmatrix} -\cos2\theta & \sin2\theta \\ -\sin2\theta & -\cos2\theta \end{bmatrix} \tag{3}$$

Repeating such a structure N times yields a total polarization transformation matrix $$T^N = \begin{bmatrix} (-1)^N \cos2N\theta & (-1)^{N+1}\sin2N\theta \\ (-1)^N \sin2N\theta & (-1)^N \cos2N\theta \end{bmatrix} \tag{4}$$

Therefore, complete coupling from one polarization to the other can be achieved by applying a force, f, to the N ridges such that $2N\theta=\pi/2$. For large $N(>5)$ this optimal force is given by $$f \sim \frac{L/\sqrt{2}\,\Delta nd\pi}{4an^3C} \tag{5}$$

For example, if $N=10$ and $L=32$ mils, using the numbers given above a force of 177 grams would be needed for complete coupling.

In the device depicted in FIG. 1, the fiber jacket was removed from the fiber 24 to expose the fiber directly to the ridges. This may not be necessary in all cases.

Figure 4:
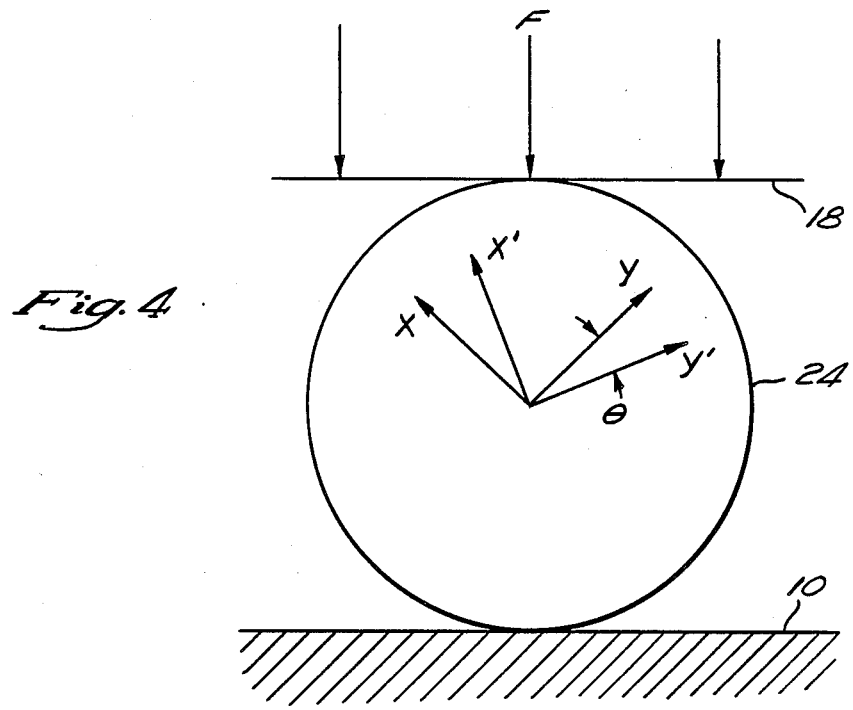
FIG. 4 shows the effect on the axes of polarization in a birefringent fiber when stress is applied.
Figure 5:
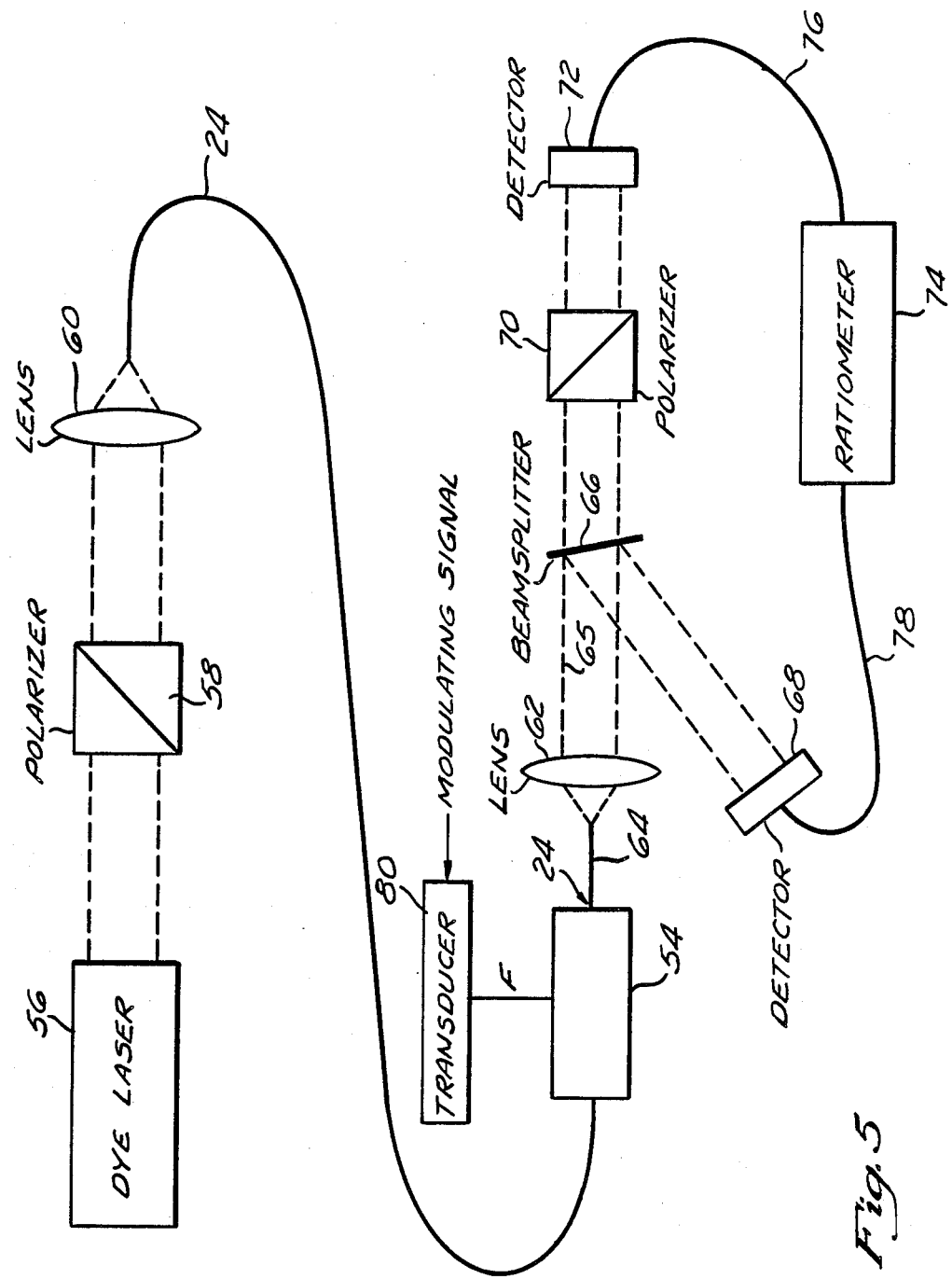
FIG. 5 is a diagram of a system using the coupler.

FIG. 5 shows a system using the polarization coupler described above in reference to FIGS. 1–4, labeled with the numeral 54. A frequency tunable dye laser 56 was used to generate the source light. This light, polarized by a standard polarizer 58, is launched into a length of elliptical core birefringent fiber 24 by a lens 60 which focuses the polarized light onto the core of the fiber. The polarizer 58 is aligned to pass light into only one of the two orthogonal polarization modes of the fiber 24. The light propagates into the fiber 24, through the polarization coupler 54, and has some or all of its power coupled into the other orthogonal polarization mode, upon exiting the fiber 24 at the fiber segment 64. A lens 62 collimates light emerging from the output fiber segment 64 and causes a beam 65 thus formed to fall on a beam splitter 66. The beam splitter 66 causes part of the beam 65 to be directed to a standard photo-detector 68 and the remaining part of the beam 65 is passed through a polarizer 70. The polarizer 70 only passes light of the same polarization relative to the polarization established by the polarizer 58. The light passed through the polarizer 70 is impressed upon a standard photo-detector 72. The outputs of the detectors 72 and 68 are input, by lines 76, 78, respectively, to a standard ratiometer which indicates the relative power in the orthogonal polarization compared to the total output power. With the polarizer 70 at the output, an extinction ratio between the fiber polarizations of between 19 and 32 dB was measured. The extinction radio is the logarithm to the base 10 of the ratio of the optical power in the vertical polarization mode to the optical power in the horizontal polarization mode. An extinction ratio of at least 19 dB was achieved regardless of wavelength when the wavelength was changed. It is believed that this limit is set by scattering loss in the fiber ($>150$ dB/km), because some of the scattered light remains guided. At certain wavelengths, the ratio improved up to 32 dB, probably due to destructive interference of the scattered light. When the ridged block 14 was placed on the fiber and pressure was applied, a coupling ratio greater than 32 dB was achieved, typically with a force of about 220 grams. The coupling ratio is the logarithm to the base 10 of the ratio between the optical power not coupled to the orthogonal polarization mode and the power that is coupled into the orthogonal mode. This ratio was observed with 10 ridges at 633 nm and with 30 and 60 ridges at about 608 nm light wavelength.

The ridges of the coupler of the present invention must be designed for a particular wavelength, because the beat length of the light in the fiber is not constant as a function of wavelength. When the device is used at a different wavelength, the phase shift, $\Delta\phi$, over a ridge length changes from $\pi$ radians to $\pi + 2\delta$ radians. Consequently, complete power transfer can no longer take place. Assuming proper force applied by each ridge so that $2N\theta = \pi/2$, the transfer matrix over a single ridge and gap period becomes $$T = \begin{bmatrix} \sin^2\theta - \cos^2\theta e^{i2\delta} & \sin\theta \cos\theta [1 + e^{i2\delta}] \approx \\ -\sin\theta \cos\theta [1 + e^{-i2\delta}] \approx & \sin^2\theta - \cos^2\theta e^{-i2\delta} \end{bmatrix} \quad (6)$$

If the light is originally launched in only one polarization, after N ridges the power coupled into the second polarization is given by $|\kappa|^2$, where $$\kappa = -\sin\theta \cos\theta [1 + e^{-i2\delta} \approx \frac{\sin(N \cos^{-1} b)}{\sqrt{1-b^2}} \quad (7)$$

where: $b = \sin^2\theta - \cos^2\theta \cos 2\delta$

The off diagonal elements of the transfer matrix represent the amount of amplitude coupling which will occur between polarization modes. This amplitude coupling, $\kappa$, is the value of each of the two off-diagonal matrix elements of $T^N$.

Figure 6:
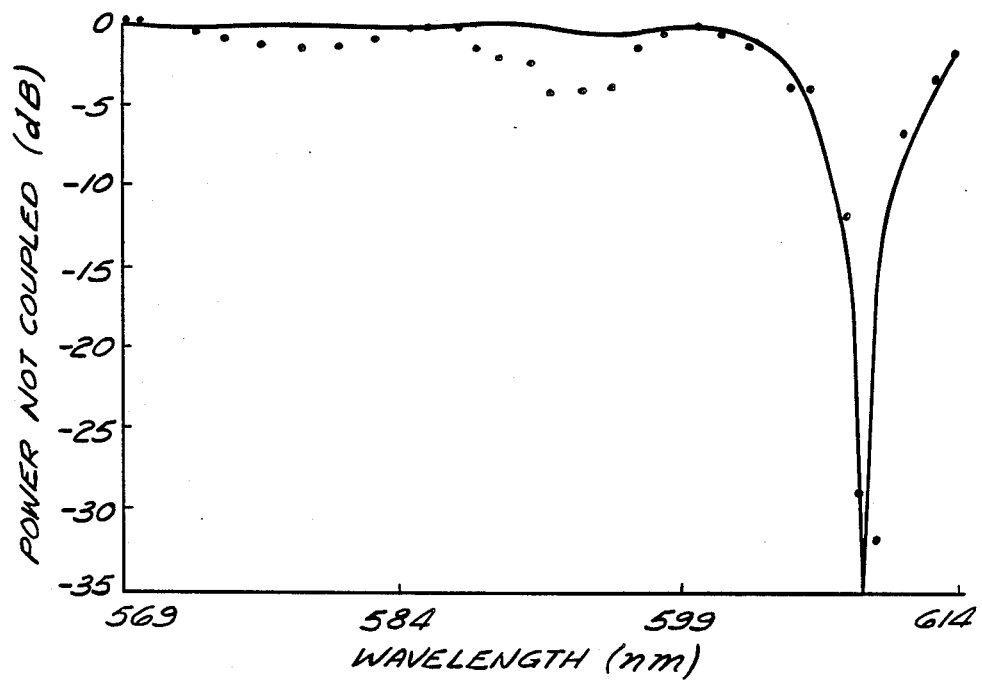
FIG. 6 is a graph of the experimentally determined coupling versus wavelength function compared to the theoretically predicted result.

The dependence of coupling on wavelength was investigated experimentally using a dye laser tunable between 569 nm and 614 nm. The device used was a 60 ridge coupler whose center wavelength was at 609 nm, to which uniform optical pressure was applied. The experimental setup was the same as shown in FIG. 5. The light left in the original polarization, i.e., not coupled, is the detected signal. The ratiometer 74 was used to compensate for laser power fluctuations as the wavelength was changed. The results are plotted in FIG. 6, which shows experimental results as dots, and the theoretical predicted results, based upon the abrupt shift in birefringence model assumed for the system, as a solid line. The good agreement between the two curves supports the conclusion that the changes in birefringence at the boundaries of the stressed regions are indeed abrupt. A full width at half maximum which is theoretically equal to approximately $\lambda/N$, was observed to be 9 nm. However, the side lobes were higher than predicted due to uneven pressure of the ridges on the fiber. This unequal pressure was probably caused by variations in the fiber diameter and ridge height on the order of angstroms, and can be dealt with by constructing individually weighted ridges. The width of the central peak indicates the potential of this polarization coupler for use as a multiplexer or notch filter.

The polarization coupler described with reference to FIGS. 1-6 above can be used as an amplitude modulator. By varying the force F in FIG. 3(a) in accordance with the modulating signal, a varying amount of power can be coupled from the X polarization mode to the Y polarization mode where the amount of coupling is proportional to the magnitude of the force F. That is, if any conventional transducer 80 in FIG. 5 varies the force F applied to the ridged block 14 of the polarization coupler 54, the optical power in the Y polarization mode of the fiber 24 will be directly proportional to the magnitude of the force F where the input power is launched initially all in the polarization mode X. This can be seen from Equation 1 where it is seen that the additional birefringence induced by the stress is directly proportional to the force applied per unit of length. When the force varies, the angle through which the axes of the polarization modes shift changes per Equation 2. This changes the amount of power shifted between the polarization modes by changing the amount of power decomposing onto each of the new axes at each boundary as will be apparent from inspection of FIGS. 3(b)-3(g).

A fiber optic frequency shifter can be made by altering the structure of FIG. 3(a) such that the ridges 16 can be independently pressed on the fiber 24 in a predetermined sequence.

Figure 3:
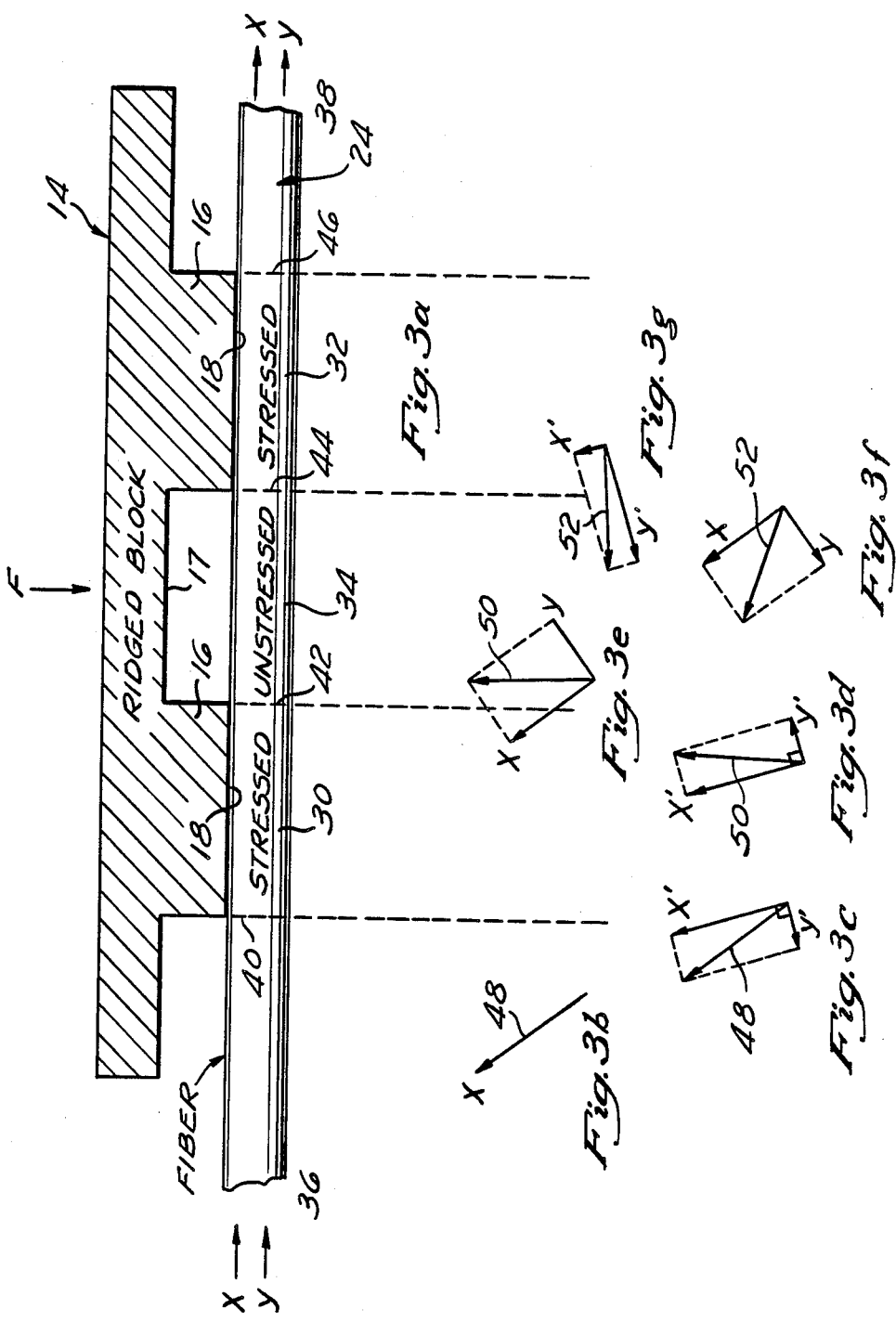
FIGS. 3(a)-3(g) show a diagram of the stressed regions in the fiber and the amount of power in the various polarization modes at various points along the fiber.

Referring to FIG. 7 there is shown an embodiment of a fiber optic frequency shifter utilizing the coupler of FIGS. 1-3 in a modified form. The modification involves separating the ridges 16 such that the surfaces 18 on the bottom of each ridge may be moved up and down independently of each other. For convenience of discussion the ridges will be renumbered as 84, 86 in FIG. 7. Separation of the ridges from each other such that they can be moved independently may be accomplished in any conventional manner, as will be apparent to those skilled in the art.

The separate ridges are individually driven by a conventional driving circuit 82. This driving circuit can be a camshaft, individual solenoids, piezoelectric transducers or any other device capable of moving the ridges independently in a predetermined sequence. The driving circuit 82 is connected to ridges 84 and 86 by symbolic links 88 and 90. The nature of these links 88 and 90 can be any type of connection appropriate to the nature of the particular driving circuit 82 chosen for the application. The purpose of the driving circuit 82 is to apply independent driving forces $F_1$ and $F_2$ to the ridges 84 and 86 in a phased relationship so as to simulate a wave moving down the fiber 24, i.e. a unidirectional travelling acoustic wave. The simulated or apparent acoustic wave is created by periodically increasing and decreasing the stress or the stressed regions in the fiber. The stress on the regions is phased to cause apparent movement of the stress down the fiber 24. These stress regions or coupling regions are spaced in a predetermined manner from each other, and they cause coupling of power from one polarization mode to the other polarization mode in the fiber 24.

The coupling at the boundaries 40, 42, 44 and 46 at the edges of the ridges 84 and 86 has previously been described. This coupling occurs in the frequency shifter of FIG. 7 in the same manner as previously described with reference to the coupler of FIGS. 1-3. That is, coupling in terms of the stress which is laterally placed on the fiber occurs the same as previously described. However, in the frequency shifter of FIG. 7 the ridges 84 and 86 are driven in a predetermined phased relationship so as to generate or simulate a travelling wave of stress propagating down the fiber 24. It is important to proper operation of the frequency shifter that such phase relationship be selected to yield an acoustic wave which has a wavelength equal to the beat length of the fiber at the particular wavelength of the input light. Thus:

$$\lambda_a = L \quad (8)$$

where $\lambda_a$ is the wavelength of the acoustic wave and L is the beat length of the fiber.

The predetermined phase relationship $\phi$ between the driving forces F, and $F_2$ should preferably be:

$$\phi = 2\pi d/L \quad (9)$$

where d is the distance (i.e. the separation length) between the ridges 84, 86; or, in a more general sense, d is the distance between adjacent time varying coupling locations, such as the adjacent boundaries 42 and 44; and L is the beat length of the fiber. Preferably, all the ridges 84, 86 are driven sinusoidally at the same frequency, which will also be the frequency of the travelling simulated acoustic wave.

Additionally, for optimum coupling, the width of the ridges 84, 86 should preferably be one half beat length or add multiples thereof.

The objective for an ideal fiber optic frequency shifter is to obtain a small, efficient frequency shifter which can be fabricated on or around a fiber optic waveguide which could transfer anywhere from 0 to 100% of the input light entering the fiber in one mode of propagation to another output mode of propagation while simultaneously shifting the output signal frequency a known amount exactly equal to the frequency of modulating signal (i.e. the frequency of the acoustic wave). Ideally, for a pure sinusoidal modulating waveform, the optical output signal would be shifted in frequency by the fundamental frequency of the modulating frequency, and there would be no harmonic components in the output light (i.e. components shifted upward and downward in frequency by multiples of the fundamental frequency).

The effect of an acoustic wave on the fiber 24 may be more fully understood by referring to FIG. 8, which represents the stress pattern of an actual travelling acoustic wave of stress propagating down a fiber 24. The actual wave of FIG. 8 applies stress forces to the fiber 24 in a longitudinal direction, in contrast to the apparatus of FIG. 7, which applies stress forces in a direction normal to the fiber 24 to simulate an acoustic wave. The lines passing in the X direction through the core and cladding of the fiber 24 represent the relative amounts of stress in the fiber at a particular location along the z axis of the fiber at a particular moment in time. That is, where the lines are spaced closer together the stress is greater than where the lines are spaced farther apart. Thus, the lines represent areas of compression and rarification of the material of the fiber as the stress wave propagates through the fiber material. The situation is similar to a sound wave passing through air or water where the "peaks" of the wave represent areas where the air molecules are compressed closer together. The "valleys" of the wave represent areas where the air molecules are more rarefied than normal atmospheric pressure, i.e., they are spaced farther apart.

Accordingly, the areas 92, 94 and 96 represent "peak" areas of compression of the fiber material while the areas 93, 95 and 97 represent "valley" areas of rarification of the fiber material. The index of refraction of the fiber material is changed wherever the molecules of the fiber have different spacing than they have in the unstressed state. This changes the orientation of the modes and causes time varying coupling of light between the modes of propagation in the fiber. That is, as time passes these areas of compression and rarification move along the z axis as the wave propagates down the fiber and continuously change the index of refraction at each point in the fiber.

These peaks and valleys of the stress wave could be represented by a sinusoid having positive peaks of maximum compression at the areas 92, 94 and 96 and negative peaks of maximum rarification at the areas 93, 95 and 97. These areas of compression and rarefaction of the fiber material change the birefringence of the fiber in accordance with the amount of the compression or rarification force acting on the fiber material, and the orientation of the stress to the principal axes of the polarization modes.

It is well known that transparent materials become temporarily birefringent when subjected to stress. This is because the separation between neighboring atomic structural units becomes different in different directions. That is, the material becomes an anisotropic structure, as opposed to an isotropic structure where the separation between neighboring atoms and the bonds tying the neighboring atoms are the same in all directions. Only anisotropic materials are birefringent. As applied to optical fibers, birefringence results in two principal, orthogonal polarization modes for which the velocity is different. The difference between the velocities, i.e., the difference between the indices of refraction, is a measure of the birefringence. For materials which are already birefringent, additional stress causes additional birefringence or a change in the existing birefringence. Certain crystals such as calcite, quartz and topaz are naturally birefringent while other crystals such as diamond are not birefringent. Optical fibers are typically formed from materials which are naturally birefringent.

It is known that in birefringent crystals, the permanent birefringence at a point may be described by an index ellipsoid, which is a three dimensional ellipse that is more or less egg shaped. The principal x, y and z semiaxes of this ellipsoid are proportional to the principal refractive indices. It is known that stressed transparent, isotropic materials exhibit temporary optical properties identical with those found in permanent birefringent crystals. The stress can be translated into principal components along each of the three principal axes of the index ellipsoid. Further, these stress components can be mathematically related to the non stressed indices of refraction and the stressed indices of refraction along each of the three axes by a well known expression.

Thus, it can be seen that, although the stresses in FIG. 8 are in a different direction than the stresses in FIG. 7, these stresses from the travelling wave will nevertheless cause time varying changes in the birefringence at all points on the fiber. If the fiber is birefringent in the absence of the travelling stress wave, the additional stress will change the birefringence so as to shift the axes of the polarization modes. The acoustically stressed fiber of FIG. 8 can be conceptualized as having an infinite number of "coupling locations" which are analogous to the coupling locations represented by the boundaries 40, 42, 44 and 46. The term "coupling location" as used herein means a disturbance point in the fiber where the axes of the polarization modes are shifted thereby causing incident light, polarized in one direction, to break into two components at the disturbance point. Each component is aligned with the two shifted axes for the polarization modes. The acoustically stressed fiber of FIG. 8 may also be viewed as having moving points of constraint stress which travel through the fiber at the same rate as the acoustic wave.

If the frequency and velocity of propagation of the acoustic stress wave in the fiber are known, it will be possible to determine the wavelength of the stress wave, i.e., the separation between the peaks 92 and 94. If the frequency of the acoustic wave is controlled so that its wavelength matches the beat length of the fiber at a given wavelength for the input light, then cumulative coupling from one polarization mode to the other will occur as the acoustic wave propagates through the fiber, in the manner as described with reference to FIGS. 1-3 above. However, not only will input light in one polarization mode be coupled into the orthogonal polarization mode, but also the output light in e.g. mode 2 will be frequency shifted compared to the input light in e.g. mode 1. The frequency shift will be equal to the frequency of the acoustic stress wave travelling in the fiber, and will be caused by heterodyning and the optical Doppler effect. Each coupling point or location can be visualized as a mixer or a square law modulator wherein the acoustic wave and the input light wave are multiplied, and their sum and difference frequencies are output in mode 2. More specifically, the acoustic wave causes the coupling at each coupling location to vary in accordance with time varying function, which is referred to herein as a coupling function. The optical signal in mode 1 is multiplied by this time varying coupling function, and the resulting mathematical expansion of the product yields a light signal in mode 2 which is shifted in frequency from the light in mode 1. The mathematical expansion of the product of two sinusoids of different frequencies contains terms at both the sum and difference frequencies as is well known in the art. Thus, the light in mode 2 includes a sideband which has a frequency equal to the sum or difference frequency between the input light and the modulating (e.g. acoustic) signal. Which of these two sidebands is produced depends upon the relative direction of the acoustic wave and the light wave.

As indicated above, because of the phased relationship between the driving functions for each coupling point 40, 42, 44, 46 in FIG. 7, an apparent stress wave will be produced with an apparent phase velocity of propagation down the fiber. Mathematically, the frequency shift which results from the multiplication of input light by this stress wave is the same as the Doppler frequency shift which would be produced by an actual stress wave which was propagating down the fiber at an actual velocity equal to the apparent phase velocity produced by the phasing relationship of the driving signals for the coupling points.

Because there are an infinite number of sampling or coupling points along the fiber 24, due to the actual acoustic wave in FIG. 8, only one frequency of wave fits the coupling or sampling function provided by this wave. This means that the output light will be frequency shifted in only one direction, i.e., that there will be only one sideband generated. Further, there will be no sideband components at harmonics of the acoustic frequency, because only one sinusoid having only one frequency can fit a coupling function with an infinite number of coupling points or locations. If there were fewer sampling points or coupling locations, more acoustic wave frequencies would "fit" this coupling function simultaneously. This means that more undesired sidebands at harmonics of the desired frequency shift would be generated.

Figure 9A:
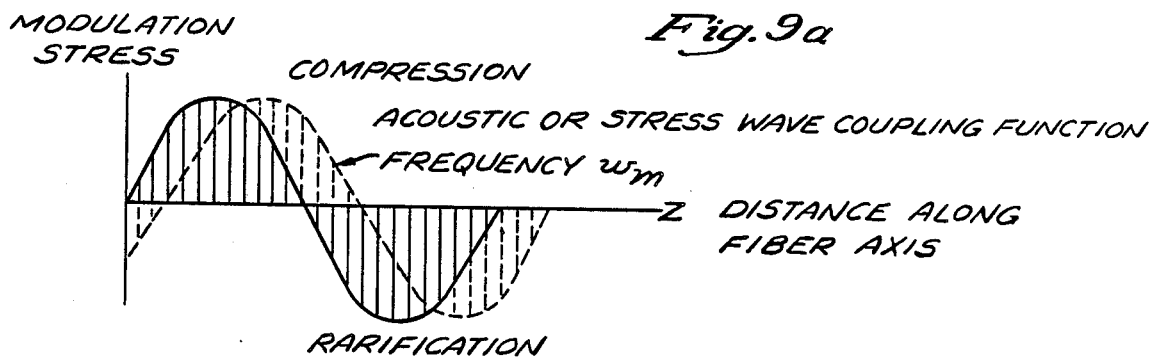
FIGS. 9(a)-9(d) represent different coupling functions for simulating an acoustic wave travelling along a fiber and their resultant light output spectrums.

The above concept may be more fully understood with reference to FIGS. 9(a)–9(d). FIGS. 9(a)–9(d) represent different coupling functions and their resultant light output spectrums. FIG. 9(a) represents a coupling function with many sample or coupling points along the z axis which is the longitudinal axis of the fiber along which the light propagates. Each vertical line represents a coupling point on the fiber where an amount of light energy proportional to the amplitude or height of the sinusoidal curve is coupled from one mode to the other. FIG. 9(a) shows the amplitudes of the coupling functions at a particular instant in time. A moment later, the stress wave will have propagated further along the z axis, as shown in dotted lines, and the amplitudes of the coupling function at all of the coupling points will have changed. Thus, each coupling element, i.e., each vertical line in FIG. 9(a), oscillates in amplitude sinusoidally, and represents a time varying coupling function at that particular point along the fiber which, if plotted against time, would yield a sinusoid. Each vertical line represents a single sinusoidally varying coupling function which is slightly out of phase with its neighbors on either side. That is, if each vertical line is 5 degrees from each of its neighbors as measured on the stress wave sinusoid, then the sinusoidal coupling function represented by each vertical line will either lead or lag its neighboring sinusoidal coupling function by 5 degrees.

It can be seen from FIG. 9(a) that, because of the large number of coupling points, a stress wave of only one wavelength can fit the points defined by the ends of each vertical line at any instant in time. Further, because the amplitudes of these lines are varying sinusoidally and because each coupling point is slightly out of phase with its neighbors in a predetermined way, the stress wave appears to move. That is, FIG. 9(a) can represent either the situation with an actual stress wave propagating in the fiber or a situation where a stress wave is apparently propagating down the fiber. In the situation where an actual stress wave is propagating down the fiber, the height of the vertical line represents the amount of light coupled from one mode to the other at the location of each line. In the situation where the stress wave is only apparently propagating down the fiber, each vertical line represents a sinusoidally varying amount of stress applied to the fiber at the location of each vertical line. The sinusoids representing the stress at each location cause an apparently moving stress wave which can cause a frequency shift in light passing through the apparent wave which is the same as would be caused by an actual stress wave of that frequency propagating through the fiber.

Figure 9B:
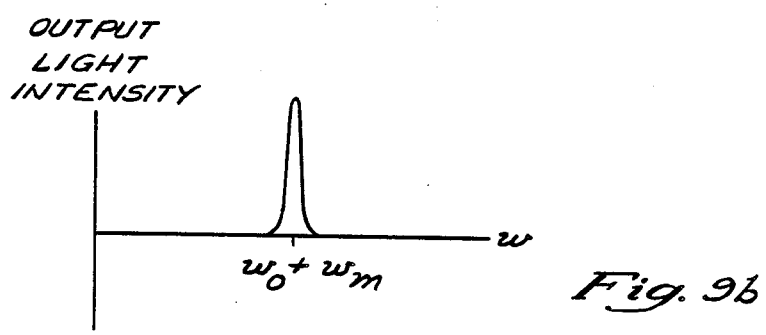

FIG. 9(b) represents the output spectrum for the coupling function of FIG. 9(a). Because only one frequency sinusoid "fits" all the points in FIG. 9(a), the output light intensity spectrum in mode 2 shows only one peak at the sideband frequency equal to the carrier frequency of the input light in mode 1 plus the frequency of the acoustic or stress wave that fits all the points.

Figure 9C:
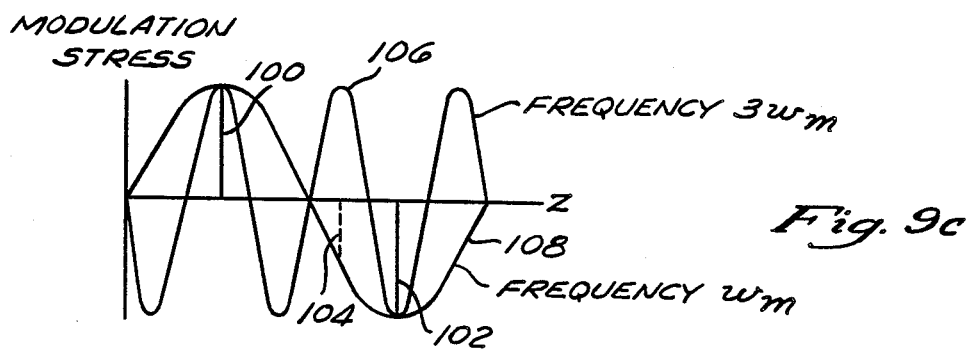

FIG. 9(c) illustrates a coupling function with fewer coupling locations or sampling points. The coupling locations are represented by the vertical lines 100 and 102. As in FIG. 9(a), these lines represent points of coupling along the fiber which are coupling sinusoidally varying amounts of power from one mode to the other. The coupling locations are sinusoidally varying stress points which are out of phase with each other by an amount equal to their separation in degrees on the acoustic wave which they are modeling.

Figure 9D:
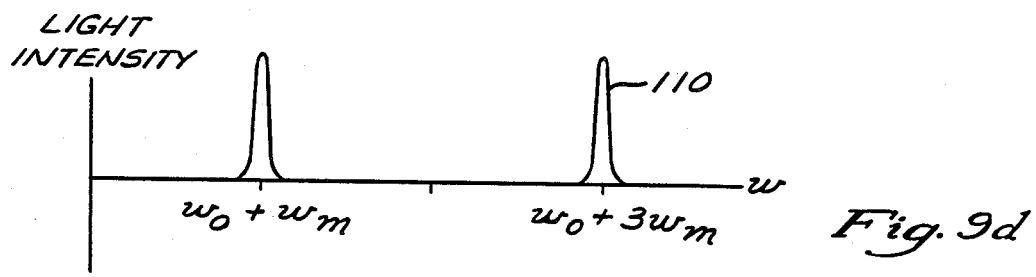

These points 100 and 102 are spaced farther apart than the coupling points of the coupling function of FIG. 9(a). Thus, more sinusoids of different frequencies and wavelengths could satisfy the coupling function represented by the lines 100 and 102, i.e., a fundamental sinusoid can fit the points as well as its harmonics. Thus if a wave of frequency $\omega_m$ satisfies the two points 100, 102, so will many of its harmonics. The light intensity in output mode 2 of a device having a coupling function such as is shown in FIG. 9(c) will have a distribution as shown in FIG. 9(d) with peaks at all the harmonics that satisfy the points on the coupling function.

Therefore, for those applications where a "clean" output with only one sideband is desirable, more coupling points are desirable. That is, the extra harmonics in FIG. 9(c) can be reduced or eliminated by adding more coupling points such as the coupling point 104 in FIG. 9(c). The harmonic 106 will not fit the coupling functions of all three coupling points 100, 102 and 104, but the modulating signal 108, which is at the fundamental frequency, will fit all three. Thus, harmonic 106 is eliminated as one of the possible waveforms which fit the coupling functions controlling the amount of light coupled at any particular instant by a coupling point from mode 1 to mode 2. This will have the effect of eliminating from the light output in mode 2 the harmonic represented by the peak 110 in FIG. 9(d).

Returning briefly to FIG. 7, the driving circuit 82 will be more fully described. The driving circuit may be any conventional mechanical or electrical circuit which is capable of driving the blocks or ridges 84 and 86 in a phased relationship so as to simulate a moving stress wave of the desired frequency and phase velocity. Thus, the driving circuit 82 and the driving links 88 and 90 could be a conventional mechanical cam shaft, as noted above. Alternatively, a conventional electronic signal generator with properly phased outputs coupled to the links 88 and 90 could be used for the driving circuit 82 and the driving links 88 and 90 could be any conventional electromechanical transducer having the proper bandwidth capabilities or the desired modulating frequency. In the embodiment disclosed, the ridges 84, 84 are an odd multiple of one half beat length in length, and one drive to oscillate sinusoidally. The separation between the ridges is an odd multiple of one forth beat length, assuming a phase difference between the driving signals of 90 degrees. In general, the distance between the ridges should equal the phase difference between the driving signals (in radius) times the beat length divided by $2\pi$ radius to ensure that only a single, unidirectional, apparent, acoustic wave is launched.

Figure 10:
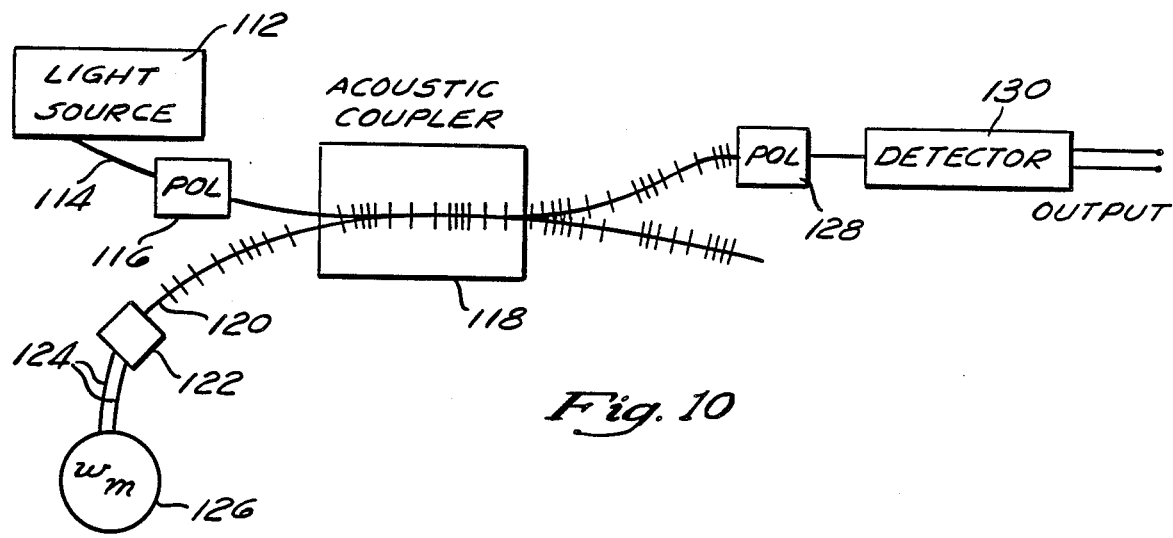
FIG. 10 is one embodiment of a fiber optic frequency shifter utilizing a travelling acoustic wave.

Referring to FIG. 10, there is shown one embodiment of a fiber optic frequency modulator utilizing an optical travelling acoustic wave. In this embodiment a light source 112 launches light into an optical fiber 114 having at least two modes of propagation each having a different index of refraction. Monomode, highly birefringent fiber is preferred where the two modes are the polarization modes. In the preferred embodiment, the fiber is selected such that a mechanical stress will cause coupling between the modes. In the case of a monomode fiber, the light is launched in one of the polarization modes through the use of a polarizer of conventional design. The polarizer passes light of only one polarization into the fiber such that all the light in the fiber 114 as it enters a coupler 118 is in one polarization mode.

Another optical fiber 120 for carrying a travelling acoustic wave also enters the coupler 118. The coupler 118 can be any structure for holding the two fibers 114 and 120 closely together such that the acoustic vibrations travelling in the fiber 120 are transferred to the fiber 114. The coupler 118 could be a region where the two fibers 114 and 120 are held together such as by epoxy or a clamp-like device. For example, two grooves with widths matching the outside diameter of the fibers 114 and 120 could be cut in two blocks of material such as quartz, plastic or metal. The depth of the grooves should be such that when the two halves are fastened together such as by glue or threaded devices, the fibers 114 and 120 in their respective grooves are clamped together. The object is to cause acoustic waves in the fiber 120 to transfer over to the fiber 114. The fibers can be glued in the grooves, and the contour or paths of the grooves should be gently curved so that fibers are not forced into any sharp bends, since such sharp bends may cause radiation losses.

An acoustic transducer 122 is mechanically coupled to the fiber 120 and is electrically driven from a pair of wires 124 coupled to the output of a signal generator 126. The signal generator 126 supplies a modulating signal of a frequency $\omega_m$. The frequency $\omega_m$ should be in the range of frequencies such that the frequency and phase velocity of the acoustic wave propagating in the fiber 120 combine to give stress "peaks" and "valleys" in the fiber 114 which are separated by the beat length of the fiber 114. That is, each stress peak caused by the acoustic wave should be separated from its neighboring stress peaks on either side 114 by a distance approximately equal to the beat length of the fiber 114.

A conventional output polarizer 128 adjusted to pass light only in the polarization mode orthogonal to the mode passed by the polarizer 116 is used to block all output light except the output light in mode 2. This output light in mode 2 will be frequency shifted from the carrier frequency of the light source 112 by the frequency $\omega_m$ of the modulating acoustic wave in the fiber 120. A detector 130 of conventional design may be used to convert the light in mode 2 to an electrical signal of the same frequency as the output light in mode 2.

Figure 11:
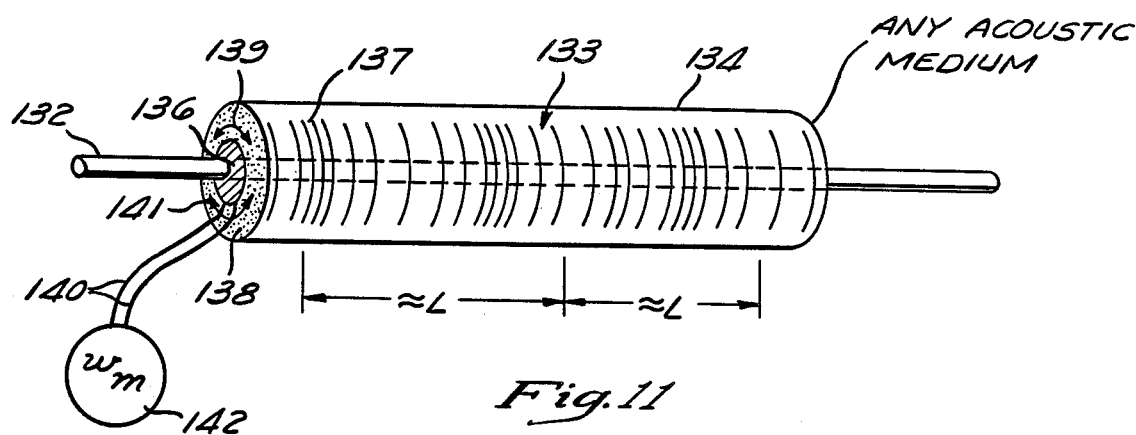
FIG. 11 shows another embodiment for shifting the frequency of light travelling in a fiber optic waveguide using an acoustic wave.

Referring to FIG. 11, there is shown another embodiment for shifting the frequency of light travelling in a fiber optic waveguide by exciting a travelling acoustic wave in the fiber. In FIG. 11 a fiber optic waveguide 132 is buried or encased in a cylindrical block of acoustic medium material 134 which has the ability to transmit acoustic waves. It is desirable that the physical size of the material 134 be substantially greater than the fiber, because acoustic waves travel at different speeds in the medium 134 than in the material of a fiber optic waveguide. It is desirable to be able to ignore the velocity of acoustic waves in the fiber, and this can be done where the mass of the acoustic medium far exceeds the mass of the fiber buried therein. The material of the acoustic medium can be any material through which sound waves propagate. This includes lithium niobate and PZT material. The fiber 132 can be glued into a hole drilled longitudinally through the acoustic medium with a suitable adhesive which will allow any acoustic stresses in the medium 134 to be transferred to the fiber 132. The fiber is preferably a birefringent, monomode fiber, but any fiber which has more than one mode and which changes its optical properties under stress such that light in one mode will be coupled to another mode will serve the purpose.

An acoustic transducer 136 is fastened to the end of the acoustic medium. The transducer is attached in a location and in such a manner that a torsional acoustic wave 133 can be generated in the medium 134 which propagates down the medium 134 in a direction parallel to the direction of the fiber 132 through the medium. There are three modes of acoustic waves which will propagate in an acoustic medium. First there is a radial mode which means the material of the medium is expanding and contracting radially, i.e., on a radius for a cylindrical cross section medium. Second there is a longitudinal mode wherein the acoustic wave propagates lengthwise down the medium in the same direction as the fiber. In this mode, the material of the medium expands and contracts along a line parallel to the longitudinal axis of the fiber in FIG. 11. The third mode is a torsional mode wherein the acoustic wave consists of torsional oscillation of the material of the medium along the perimeter of circles concentric with the longitudinal axis of the fiber 132 in FIG. 11. This movement is symbolized by the arrows 139 and 141 in FIG. 11.

Only the acoustic wave torsional mode will cause any coupling between the modes in the fiber 132. Accordingly, a transducer 136 should be selected which excites the torsional mode of propagation. The structure of such transducers is well known in the art.

The transducer must be sized so that its resonant frequency is such that the peak stress areas of the torsional wave propagating along the length of the fiber are one beat length apart. The location of the transducer could be centered around the point where the fiber 132 enters the medium 134 or it could be at some other location on the end surface 138 of the medium 134. Preferably the fiber 132 passes through the center of the cylinder of the medium 134.

The transducer 136 can be any conventional transducer which can convert electrical driving signals on a pair of wires 140 to mechanical vibrations which are coupled to the medium 134. Piezoelectric crystals have been found to be satisfactory for such devices. The wires 140 are coupled to the output of a signal generator 142 which generates the modulating signal at a frequency $\omega_m$. Again as in the case of the embodiment of FIG. 10, $\omega_m$ and the velocity of propagation of the acoustic wave 133 is such that the distance between the peaks of stress caused by the acoustic wave is approximately equal to the beat length, L.

In both the embodiments of FIGS. 10 and 11 the peaks of stress such as the peak 137 in FIG. 11 are analogous to the leading edge of the ridge 84 in FIG. 7 and the ridges 16 in FIG. 2. Similarly, the stress peaks, such as the peak 137, when transmitted into the fiber 132, are analogous to the boundaries 40 and 44 between the stressed and unstressed regions in the fiber 24.

Figure 12:
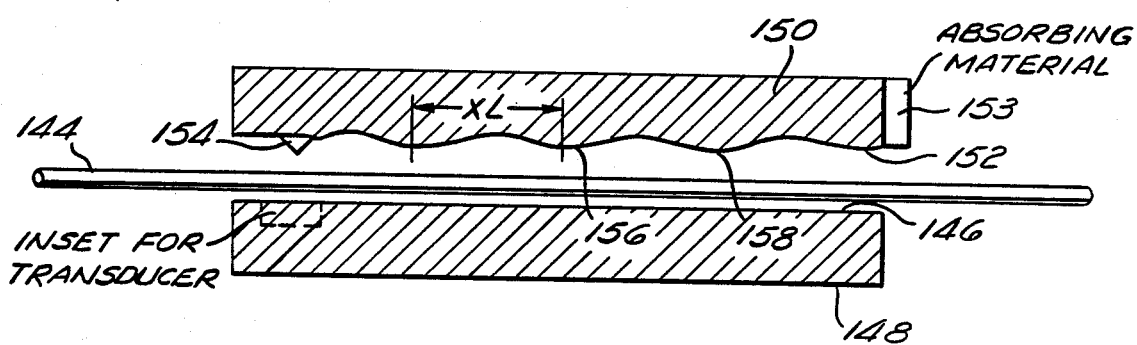
FIG. 12 shows another embodiment of a fiber optic frequency shifter using a travelling acoustic surface wave.

Referring to FIG. 12, there is shown another embodiment of a fiber optic frequency shifter using a moving surface wave. In this embodiment, a fiber 144 is placed on a flat, optically polished surface 146 of a lower block 148 of material. An upper block 150 having an optically flat, polished surface 152 has a conventional surface acoustic wave transducer 154 attached thereto. This transducer is connected to a modulating signal generator (not shown) which supplies a modulating signal of a frequency $\omega_m$. The transducer 154 causes a surface acoustic wave to propagate down the surface 152 where it is absorbed by a clay-like absorbing material 153 on the end of the upper block 150. The absorbing material prevents reflection which might convert the travelling wave into a standing wave. This surface acoustic wave is shown in FIG. 12 as causing a ripple in the surface 152. This ripple has a wavelength between peaks of approximately the beat length of the fiber 144. Because the surface 146 is flat and the surface 152 is undulating with a travelling acoustic wave, the fiber 144 is periodically squeezed between these two surfaces by a periodic stress wave. This stress wave is propagating down the fiber with the periodicity established by the frequency $\omega_m$ and the velocity of propagation of the surface wave. This moving periodic stress wave causes power transfer between polarization modes in the manner described above with reference to FIGS. 1–3.

Figure 13:
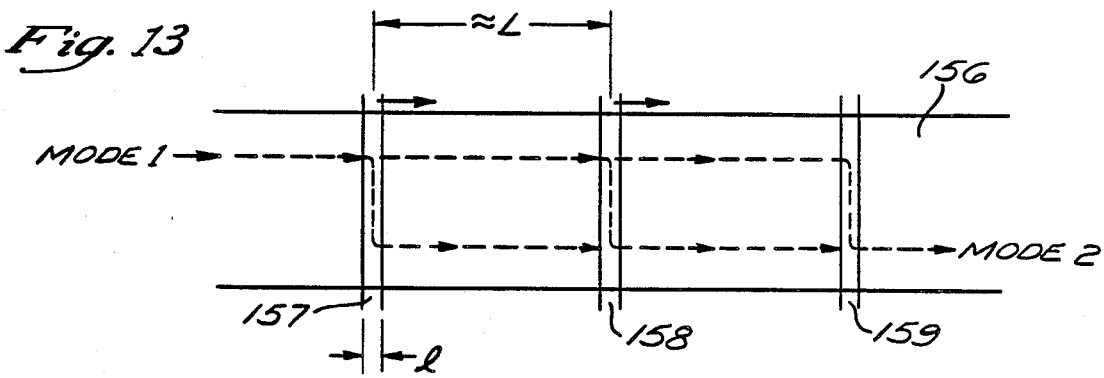
FIG. 13 shows the concept of moving or apparently moving coupling regions in a fiber.

The actual or apparent movement of the stress along the fiber causes a doppler effect or hetrodyning frequency shift. This moving stress is illustrated in FIG. 13. A fiber 156 has two modes of propagation, each of which has a different index of refraction. The fiber has a beat length L. The regions 157–159 in the fiber represent locations where there is a relatively abrupt change in the optical characteristics of the fiber which causes coupling of power from one mode to the other. In each coupling location 157–159, some fraction of the power in mode 1 is coupled into mode 2. The stress at coupling locations 157–159 can be either actually moving along the fiber as in the case of the actual acoustic wave of FIGS. 10–12, or apparently moving such as when the ridges 84 and 86 of FIG. 7 are driven in phased relationship to each other to produce a simulated or apparent acoustic wave. The width of the coupling locations 157–159 must be shorter than the beat length and there must be a certain abruptness of the shift in optical characteristics which can be characterized as:

$$l = <(L/4N) \tag{1}$$

where $l$ equals the width of each coupling region 157–159 and L equals the beat length and N equals the number of coupling locations. In FIGS. 7 and 3, $l$ represents the width of the transition boundary regions 40, 42, 44 and 46 under the edges of the ridges 16, 84 and 86. The coupling of a portion of the power in mode 1 into mode 2 in these coupling locations is represented by the dotted lines going from mode 1 to mode 2 in each of the coupling regions 157–159.

Figure 14:
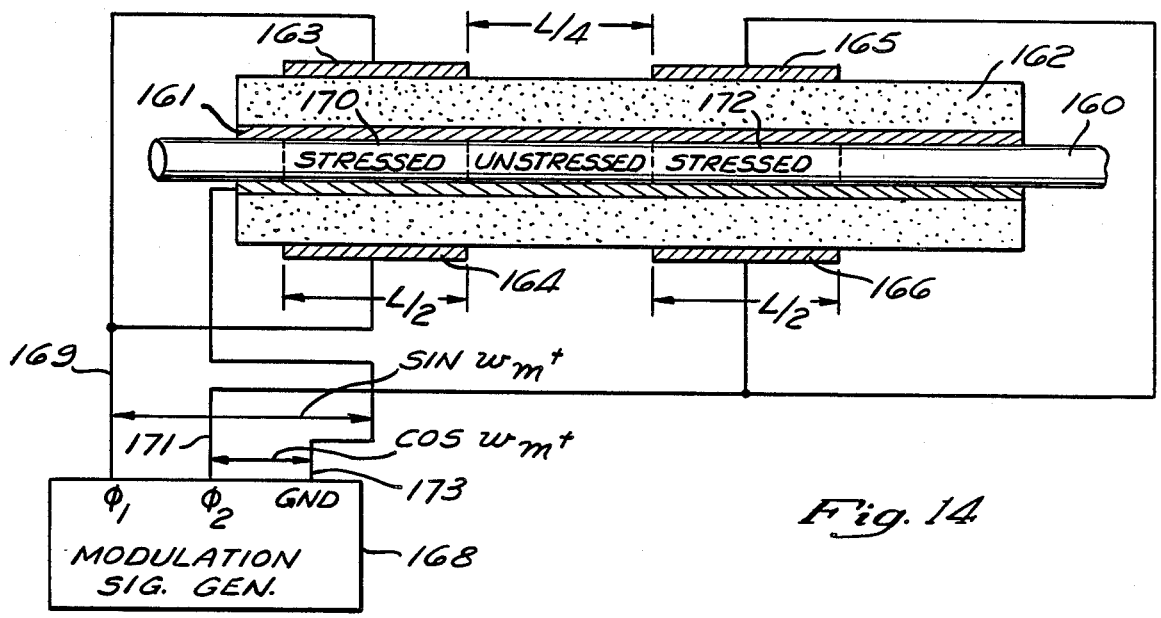
FIG. 14 shows another embodiment for a fiber optic frequency shifter utilizing a piezoelectric jacket surrounding the fiber.

Another embodiment for a fiber optic frequency shifter is shown in FIG. 14. A birefringent, monomode fiber or a single crystal fiber 160 is surrounded by a metal electrode 161 which itself is surrounded by a concentric piezoelectric jacket material 162. The metal electrode 161 may be formed on the fiber by conventional sputtering techniques. The fiber and metal electrode can be placed in the jacket 162 by cutting a groove along the longitudinal center line of two halves of a cylinder of a piezoelectric material such as PZT or hardened $PVF_2$ and affixing the fiber in the groove in some suitable manner such as by an adhesive. The two halves of the cylinder can then be mated with the fiber optic waveguide 160 mated therebetween. Alternatively, the fiber and metal electrode can be drawn through a melt of $PVF_2$. Metallic electrodes 163–166 can then be formed on or attached to the piezoelectric jacket 162 in any known manner. The electrodes 163-166 could preferably be formed on the piezoelectric jacket 162 using known integrated circuit techniques such as vacuum evaporation in hot filament or electron bombardment evaporators. These processes are well known in the art. Photoresist and etching techniques can be used to define the electrodes.

As is well known, piezoelectric materials become strained, i.e., they exert force in attempting to or actually changing their dimensions, when subjected to electric fields. The piezoelectric deformation is directly proportional to the field, and it reverses in direction as the sign of the field is reversed. The basic piezoelectric materials are crystalline quartz, PZT and rochelle salt, but barium titanate and certain plastics such as $PVF_2$ are becoming more popular.

The electrodes 163-166 can be applied directly to the surface of the piezoelectric jacket 162 or they can be mounted externally in close proximity to the quartz element. They should extend over the perimeter enough to create an electric field in enough of the piezoelectric jacket 162 to exert enough stress on the fiber 160 to appreciably change the orientation of the axes of the polarization modes. The electrodes 163-166 should be L/2 (i.e. one half beat length) long in the longitudinal direction (or an odd multiple thereof), to ensure efficient power transfer between the modes. It is preferable to space them so that as many sample points as can be fit into one beat length are achieved. For example, a separation of L/4 is shown in FIG. 14 such that three coupling points for the coupling function exist within each beat length. It is also possible to enclose the whole assembly in an evacuated chamber to improve the Q of the piezoelectric "circuit" and to reduce aging drift. If higher power handling capabilities are required, the piezoelectric material could be surrounded by an inert gas such as nitrogen or helium.

A modulating signal generator 168 has two phased outputs, and provides driving signals which are offset by a predetermined phase difference depending upon the application. For a spacing of L/4 between the electrode pair 163/164 and the pair 165/166, the phase difference between the first output on a line 169 and the signal on the second output line 171 is preferably 90 degrees or $\pi/2$ radians. Other spacings between the electrodes may be utilized, however, in such case, the phase difference between the driving signals should preferably be adjusted to a value equal to the spacing times $z\pi$ divided by the beat length, so that the acoustic wave length will be equal to the beat length of the fiber. The output line 169 is coupled to the electrode pair 163/164. The output line 171 is coupled to the electrode pair 165/166. A ground line 173 is coupled to the middle electrode 161.

The orientation of the dipoles of the piezoelectric jacket is radial. For $PVF_2$ jackets 162, the dipoles can be aligned after solidification by conventional techniques such as applying a large voltage between the electrodes 163-166 and the center electrode 161. In the embodiment of FIG. 14, the piezoelectric jacket 162 is cut or oriented such that the electric field between the electrodes 163 and 164 causes the piezoelectric material between the electrodes to deform so as to squeeze the fiber 160 radially. This deformation is such as to squeeze the fiber 160 in the region between the outer extremities of the electrodes 163 and 164. The same is true of the electrodes 165 and 166. The result is stressed and unstressed regions in the fiber similar to the regions caused by the ridges 16 in FIG. 3. If the electrode pairs 163/164 and 165/166 are an odd multiple of one half of a beat length in length and are separated by one quarter of a beat length a travelling acoustic wave will be excited or simulated if the electrode pairs are driven respectively by sine and cosine functions, i.e., 90 degrees out of phase with each other. This means that the stressed regions in the fiber 160 will actually or apparently move from left to right at a phase velocity set by the frequency $\omega_m$ of the driving sinusoids from the modulation signal generator 168. That is, the magnitude of the stress in the region 170 of the fiber 160 will be varying sinusoidally at $\omega_m$ frequency while the stress in the region 172 of the fiber 172 will also be varying sinusoidally at $\omega_m$ frequency. However, the two driving sinusoids causing the stress are 90 degrees out of phase with each other, so the stress in the fiber appears to move from left to right.

This movement is illustrated in FIG. 15. FIG. 15(a) depicts portions 186, 188 of a fiber which are stressed by the stressing members such as the ridges of a ridged block or the piezoelectric material of a jacket or piezoelectric block. The stressed portion or region on the left is driven as the sin ($\omega_m t$) and the stressed portion on the right is driven as the cos ($\omega_m t$). FIG. 15(b) illustrates the stress exerted on the fiber at the two stressed portions at a time $t_1$ when the sine is maximum and the cosine is zero. The dashed vertical lines at the edges of the stressed portions represent the boundary regions analogous to the regions 40, 42, 44 and 46 in FIG. 7. The vectors 170 and 172 in FIG. 15(a) represent the coupling which occurs at the boundary regions between the stressed and unstressed regions of the fiber. The length of the vector 170 represents the amount of power coupled between modes in the fiber, and the direction of the vectors represents the direction of the shift of the axes of birefringence, i.e., the direction of change of orientation of the orthogonal polarization modes. The vector 170 represents a fraction of power coupled from mode 1 to mode 2 by the decomposition illustrated at the boundary 40 in FIG. 3 where the axes of birefringence shift from X and Y to X' and Y'. The vector 172 represents the same fraction of power coupled from mode 1 to mode 2 by the decomposition of the vector 50 in FIG. 3(d) back onto the X and Y axes from the X' and Y' axes at the boundary or coupling region analogous to the boundary 42 in FIG. 3(a). Referring briefly to FIG. 3, it will be recalled that, because the boundary 42 is half a beat length away from the boundary 40, both coupling locations 40 and 42 couple power from mode 1 to mode 2, i.e., from the X polarization to the Y polarization. Such coupling at both boundaries 40, 42 is due to the 180 degree phase change between the light in the two modes while travelling the half beat length between the boundaries 40 and 42, and from the opposite direction of the shifts in orientation of the polarization mode axes at the boundaries 40 and 42.

Figure 15A:
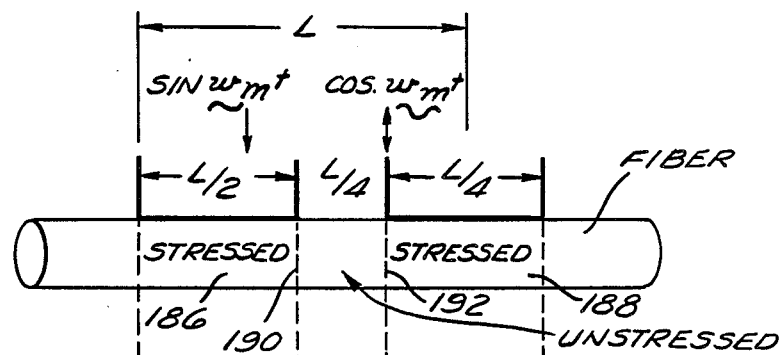
FIG. 15 illustrates the apparent movement of stress regions caused by stressing fiber at two different locations by sinusoidal functions which are out of phase with each other.
Figure 15B:
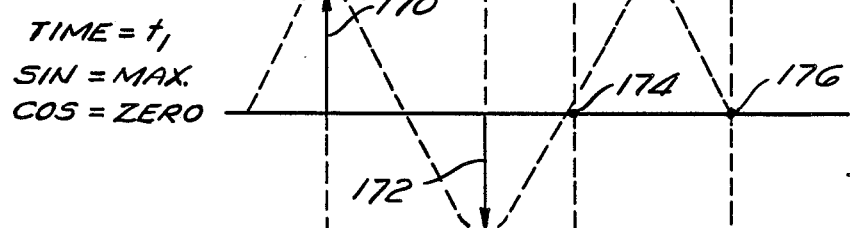

The dots 174 and 176 in FIG. 15(b) represent the lack of coupling at those locations because at time $t_1$, the cosine is zero so no stress is being applied to the fiber.

Figure 15C:
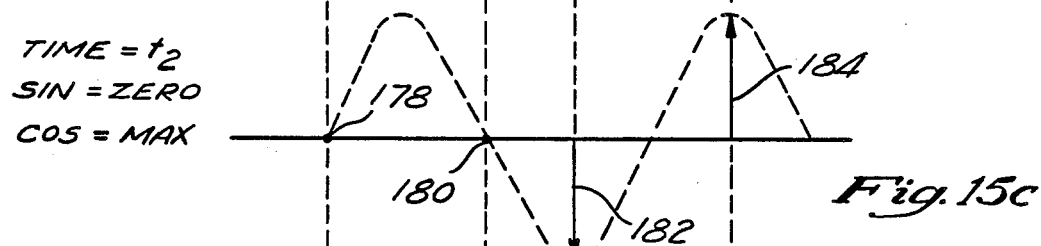

FIG. 15(c) represents the situation at a time $t_2$ when the sine driving function is at zero and the cosine driving function is at a maximum. The points 178 and 180 represent the lack of any coupling at these two points on the fiber. Likewise, the vectors 182 and 184 represent the coupling at these locations as a result of the stress on the fiber caused by the cosine function. From FIGS. 15(b) and 15(c) it is seen that the coupling regions are apparently moving from left to right.

Figure 15D:
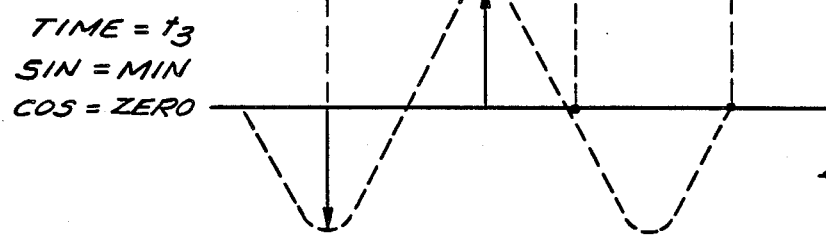

FIG. 15(d) represents the situation at the time $t_3$ when the sine is a maximum and the cosine is zero and the cycle starts again.

It is seen from FIG. 15(a) that the stressed regions 186 and 188 have stress levels which are oscillating sinusoidally and these sinusoids are 90 degrees out of phase with each other. Further, the boundary regions 190 and 192 are spaced 90 degrees apart in terms of the phase difference which arises between the light travelling in mode 1 versus the light travelling in mode 2 while travelling between the boundaries 190 and 192. This results in a simulation of an acoustic wave moving from left to right and no wave moving from right to left. Thus, proper matching of the phase relationship of the driving signals to the separation of the stress regions results in a cancellation of one of the sidebands generated by the apparently moving stresses such that the device becomes a single sideband frequency shifter.

Figure 16:
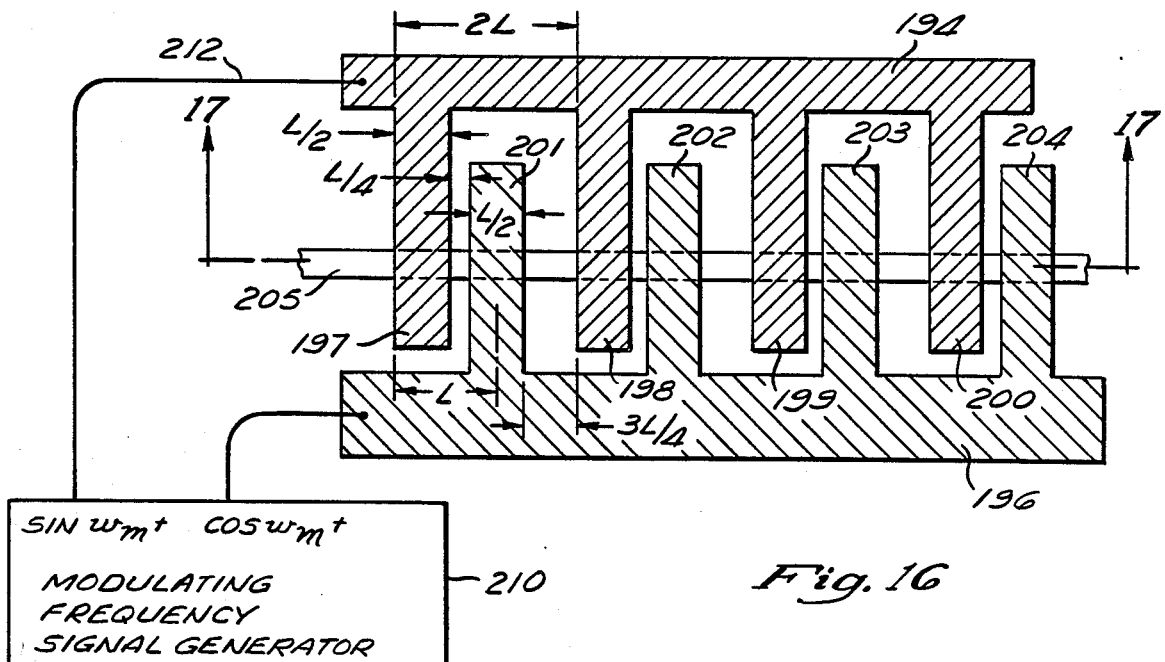
FIG. 16 is a cut away top view of another embodiment of a fiber optic frequency shifter utilizing interdigital electrodes mounted on a piezoelectric plate.
Figure 17:
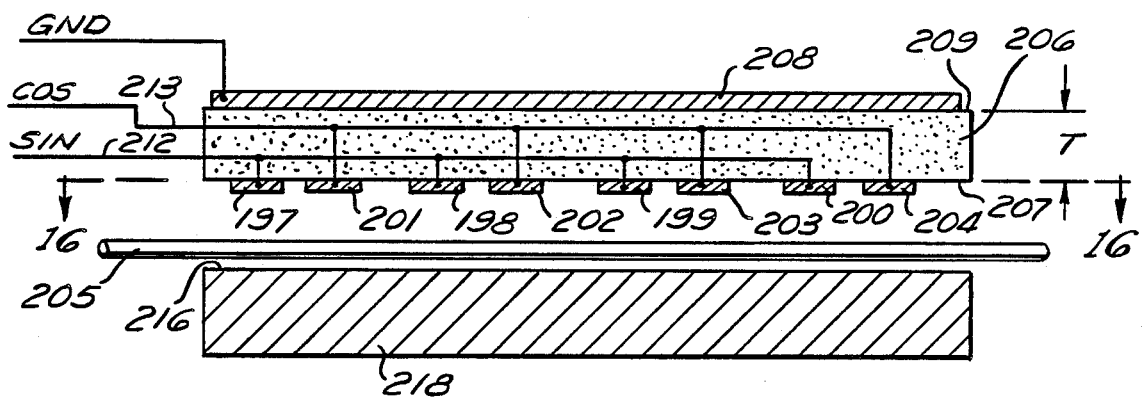
FIG. 17 is a sectional view of the complete fiber optic frequency shifter as viewed from the section line 17—17 in FIG. 16.

Referring to FIG. 16 there is shown a cut away top view of a fiber optic frequency shifter using interdigital electrodes and piezoelectric material with the piezoelectric material removed to expose the electrodes. FIG. 17 shows a sectional view of the complete fiber optic frequency shifter as viewed from the section line 17—17 in FIG. 16.

In FIG. 16, the interdigital electrodes 194 and 196 have interleaved finger-like projections 197-200 and 201-204, respectively. The fingers 197-204 each have a width equal to an odd multiple of one half the beat length L of a fiber optic waveguide 205. Preferably the electrodes are one half beat length in width. Preferably the waveguide 205 is single mode and highly birefringent although it could be multimode, or a single crystal, anisotropic fiber.

By way of example, the finger pairs such as the pairs 197/201, 198/202, 199/203 and 200/204 may have a spacing between the two fingers or each pair equal to one fourth the beat length as shown, but other spacings can be used, as will be described below. The number of pairs depends upon the desired bandwidth and the maximum amount of power transfer desired. The bandwidth becomes narrower with an increasing number of pairs and becomes broader with increasing wavelength. The spacing between the adjacent pairs of fingers, by way of example, may be three fourths of a beat length.

Referring to FIG. 17, the driving signal electrode fingers 197-204 are attached to or near the underside 207 of a block 206 of piezoelectric material. A ground electrode 208 is attached to or near the opposite side 209 of the piezoelectric material 206. The electrode fingers 197-200 can be connected to a modulating frequency signal generator 210 in FIG. 16, and this is shown symbolically by the wire 212. Although this wire 212 appears in FIG. 17 to run through the piezoelectric crystal 206, this is only for convenience of representation and need not represent reality. The same is true for a wire 213 which represents coupling of the fingers 201-204 to another output of the modulating signal generator 210 which carries a signal which is 90 degrees out of phase with the signal on the fingers 197-200. The electrode 208 is for connecting to the ground terminal of the signal generator 210.

The fiber 205 is placed between the electrode fingers 197-204, and an optically flat surface 216 of a support block 218. The electrode fingers 197-204 should have a dimension and rigidity similar to the ridges 16 in FIG. 2.

Softer metals are preferred for the electrodes 197-204 to lower the risk of breaking the fiber.

The operation of the device of FIGS. 16 and 17 relies on the change in dimensions of the piezoelectric material 206 caused when an electric field is applied between the electrode fingers 197-204 and the ground electrode 208. The electrode 194 is driven as a sine and the electrode 196 is driven as a cosine. Because it is desirable to get as many sampling points into one beat length as is possible for narrow bandwidth and few sidebands, and because the electrodes are an odd multiple of one-half a beat length wide, the second electrode finger in each pair is moved over toward its partner in the pair. This results in three coupling locations within one beat length, or three sampling points on the acoustic wave to be modeled. The third point eliminates many harmonic frequencies for the acoustic wave which would otherwise fit the two other points as described in connection with FIG. 9(c).

Because, in some applications, it is desired to model an acoustic wave travelling from left to right in the fiber 205 with stress boundaries such as 190 and 192 in FIG. 15(b) which are physically separated by 90 degrees on the wave, the two driving points should be driven 90 degrees out of phase for a spacing of L/4 between the electrodes in the pair. The spacing of the electrodes in each pair and the relative phase of the driving signals applied to them will determine whether an acoustic wave is actually launched on the surface 207. If the relative phase and frequency of the driving signals is matched to the physical separation of the electrodes, a resonance will be established and an actual acoustic wave will be excited in FIG. 17 which will travel in one direction only on the surface 207. Such resonance will occur at the following frequency:

$$f_r = (V_a/\lambda_a) \tag{10}$$

where $f_r$ is the resonant frequency for the driving signals, $V_a$ is the velocity of an acoustic wave in the medium (e.g. the PZT material 206), and $\lambda_a$ is the wavelength of the acoustic wave which should equal one beat length in accordance with equation (8). If the frequency of the driving signal does not match the resonant frequency established by the physical separation, the beat length, and the velocity of propagation of the surface wave, then the electrodes 197-204 will not excite an actual surface acoustic wave. In such a case, the electrodes 197-204 would press up and down on the fiber 218 to simulate the stress in the fiber which would be generated if an acoustic wave actually was travelling through the fiber. This would effectively establish sample points defining all the acoustic waves of different wavelengths which could fit those sampling points. This concept is the same as discussed with reference to FIG. 9(a)-9(d). The output sidebands would then depend upon how many different frequency acoustic waves could fit the sampling points. This can be visualized with reference to FIGS. 15(b)-15(d).

The exemplary 90 degree phase relationship between the driving signals, and the $\pi/4$ separation between the electrode pairs, described above, is not critical. For example, many other physical separations between the pairs would work equally as well as long as the electrodes or ridges causing the stress regions were driven by functions which were out of phase by an amount matched to the physical separation in degrees on the acoustic wave to be launched. Assuming the driving frequency maintained at the resonant frequency defined by equation (10), the resonance criteria mentioned above will still be satisfied in either of the following two alternative cases. First, if the separation is changed to any arbitrary amount and the phase of the driving signal is matched properly to the separation, in accordance with equation (9), resonance will be maintained. Second, if the phase of the driving signals is not changed, the separation can be increased in full beat length increments while still maintaining resonance. That is, any separation will work to launch an acoustic wave as long as the phase difference of the driving function is properly phase matched to the separation of the electrodes, and the driving frequency is at the resonant frequency $f_r$. Thus if a separation of L/3 is chosen, or 120 degrees on the acoustic wave, then the driving functions for the electrode or ridge pairs within each beat length should be 120 degrees out of phase with each other.

The effect of matching the spacing of the electrodes or ridges to the phase difference between the driving functions is to eliminate one of the sidebands. That is, if the spacing of the electrodes does not match the phase difference of their driving signals, a backward travelling wave and a forward travelling wave can each satisfy the sampling points. Only one of these waves is desirable and the other must be cancelled, so that only a single sideband of shifted carrier frequency light emerges from mode 2. If the other acoustic wave is not cancelled, both an upper and a lower sideband will be generated. Proper phasing of the driving function in relation to the spacing cancels one of the waves.

The piezoelectric material 206 is cut such that the poles of the piezoelectric crystal are parallel to the desired direction of movement of the piezoelectric crystal. In the device of FIGS. 16 and 17, the desired direction of expansion and contraction of the piezoelectric material is toward and away from the surface 216 such that the electrode fingers pairs will be pressed down upon the fiber 205 in accordance with the magnitude of the driving signal.

The spacing of 2L between the leading edge of each electrode pair and the leading edge of the next electrode pair is selected so that the next periodic structure, comprised of an electrode pair, starts at a point on the fiber where the light in the two modes is again in phase which is at every beat length.

The expansion and contraction of the piezoelectric medium 206 occurs only where there is an electric field. Thus the strain occurs generally only below the electrodes, because the electric field exists only between the ground electrode 208 and the electrodes 197-204. The strain is proportional to the magnitude of the electric field. Therefore, the amount of force exerted on the fiber segments below each electrode varies sinusoidally with the magnitude of the modulating signal on each electrode.

The piezoelectric slab 206 should be cut such that the thickness, T, causes an acoustic resonance in the piezoelectric material in the direction of the dimension T. This is because T is matched appropriately to the modulating frequency $\omega_m$. This increases the efficiency of the frequency shifting effect. It is undesirable to have a resonance in the direction of propagation of the fiber, because that will cause sliding of the electrodes 197-204 along the fiber.

Figure 18:
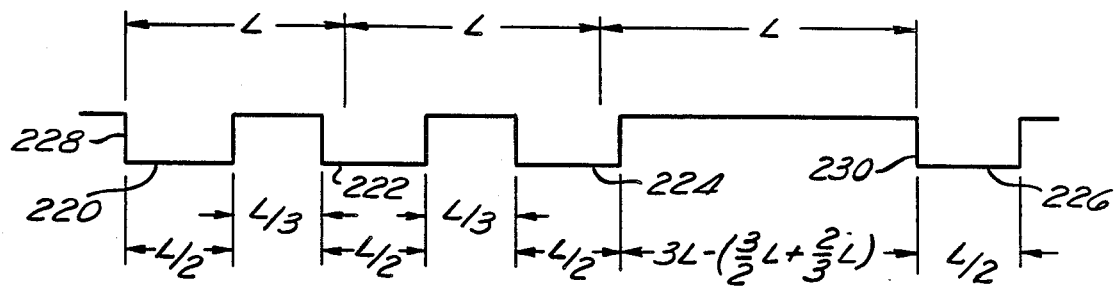
FIG. 18 shows an alternative electrode embodiment for the device of FIGS. 17 and 18.

FIG. 18 shows another of the many variations of the electrode structure of FIG. 16 which will function to shift frequency. In this embodiment, every second electrode 220 and third electrode 224 are shifted leftward while the first electrode 220 and the fourth electrode 226 are placed with their leading edges 228 and 230 respectively at the starting points of the first and fourth beat lengths respectively. Now the electrodes 220, 222 and 224 are driven 120 degrees out of phase and the electrodes 224 and 226 are driven with a phase difference equal to $3L-(3/2L+\frac{2}{3}L)=0.83$ L or 300 degrees out of phase. This process of rearranging the electrodes can be varied such that a very large number of possible electrode arrangements is available. As long as properly phase modulating signals are used to drive them, all such arrangements will achieve the same end result. Some arrangements will be better than others, however. With the criteria for an ideal device being 100% power transfer between modes and only one sideband with no harmonics and the frequency shift exactly matching the frequency of the modulating signal, those arrangements which maximize the number of coupling points per beat length and which apply a sufficient amount of force to cause appreciable shift in axes of birefringence will work best.

Figure 19:
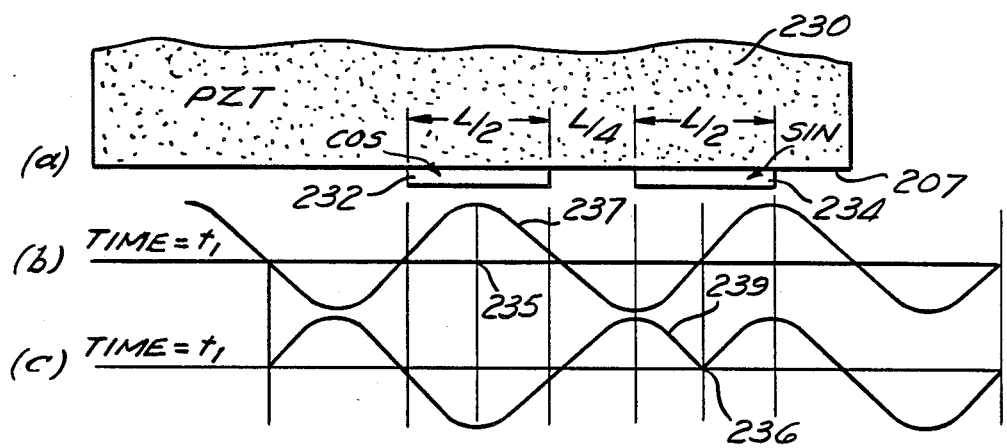
FIG. 19 illustrates how an actual acoustic wave can be launched under certain conditions by the electrode arrangement of FIGS. 17 and 18.

The resonant case for launching an acoustic wave with the structure shown in FIGS. 16 and 17 is illustrated in FIG. 19. The electrodes are sized and spaced as shown in FIGS. 16 and 17, and are used to excite a surface acoustic wave in the piezoelectric material 206 by matching of the frequency of the acoustic wave modulating signal to the resonance frequency set by the separation of the electrodes and the acoustic wave propagation velocity. The first electrode 197 launches a surface acoustic wave which has a wavelength which is preferably equal to the beat length. This is achieved by driving the electrode 197 at a modulating frequency which is equal to the velocity of propagation of the surface wave divided by the beat length.

Directionality of the surface acoustic wave is achieved by properly phasing the driving signals of adjacent electrodes such that the waves travelling in the non-selected direction cancel each other. FIG. 19 shows a piezoelectric slab 230 with a sine driven electrode 232 thereon which is L/2 wide and which is separated by L/4 from a cosine driven electrode 234 which is L/2 wide. FIG. 19(b) shows the surface acoustic wave (SAW) generated on the surface of the PZT block 230 caused by the sine driven electrode 232 originating at the location 235 and propagating in both directions beginning at a time $t_1$. FIG. 19(c) shows the SAW generated by the cosine driven electrode 234 starting from the location 236 at time $t_1$ and travelling in both directions.

It is apparent that the peaks of the sine wave 237 coincide in space and time with the valleys of the cosine wave 239 at all points left of the location 236. Also, the valleys of the sine wave 237 coincide with the peaks of the cosine wave 239 to the left of location 236. Therefore, cancellation of the SAW left of the point 236 occurs. However, to the right of the point 236, the peaks of both waves 237 and 239 coincide as do the valleys so the waves reinforce each other. Thus, the peaks of the surface wave on the PZT surface 207 cause the electrodes or the surface of the PZT itself to exert force on the fiber at points to the right of the point 236.

Figure 20:
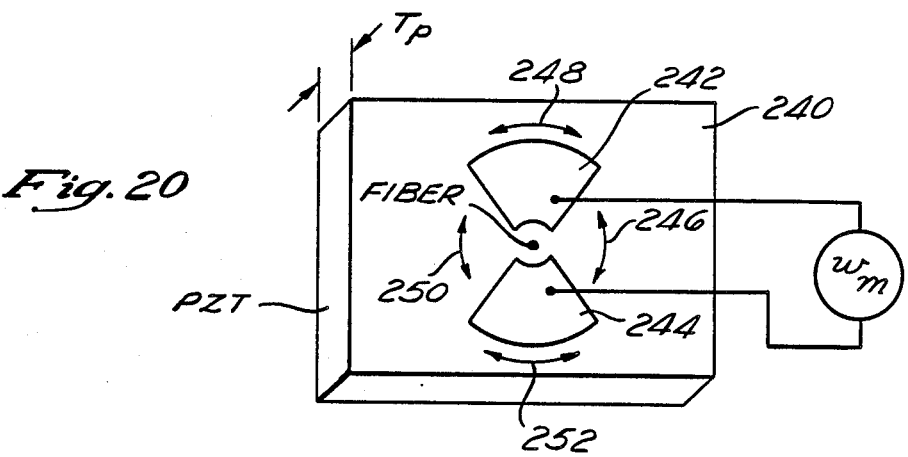
FIG. 20 is a structure for a transducer to excite torsional mode acoustic waves in the acoustic medium of FIG. 11.

Referring to FIG. 20 there is shown a transducer for exciting a torsional mode acoustic wave in the embodiment of FIG. 11. The transducer is a block 240 lithium niobate with a thickness $T_p$ which determines the resonant frequency of the crystal. The modulating frequency $\omega_m$ is determined from the beat length. Thus $T_p$ is selected for resonance at $\omega_m$. Two metallic contacts 242 and 244 are placed on the surface of the block 240 such that the modulating drive signal may be applied between the electrodes. The pattern of the oscillating electric field and the cut of the piezoelectric crystal 240 is selected such that time varying torsional strains are induced as represented by the arrows 246, 248, 250 and 252 are induced. These torsional strains are coupled to the material of the acoustic medium 134 by fastening the block 240 to the medium 134. the transducer of FIG. 20 could also be attached to the fiber 120 in FIG. 10 to cause a torsional acoustic wave to propagate to the coupler 118 and to transfer the torsional acoustic wave to the light carrying fiber 114.

In systems using the frequency shifters described herein, a light source will typically be coupled to the fiber so as to couple light into only mode of the fiber. In birefringent fibers this is done by using a polarizer to block out all light except for one polarization which is then coupled into one of the polarization modes. These techniques are well known to those skilled in the art. The coupled and frequency shifted light then exits from the second mode. It is desirable to filter out any light which exits from the output of any of the frequency shifters described herein in any mode other than the mode carrying the frequency shifted light. With monomode birefringent fiber, this can be done with a polarizer on the output. With two mode fibers this can be done with a mode stripper that bends the fiber sufficiently that one of the modes cannot propagate past the bend, as is well known in the art.

Figure 21:
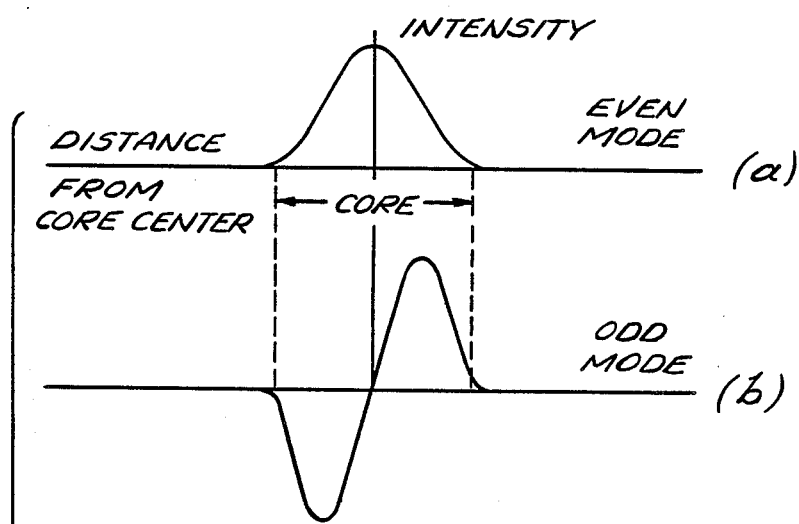
FIGS. 21(a)-(e) shows the spatial distribution of odd and even modes in a two mode fiber.

Non-birefringent fiber can also be used for the frequency shifters described herein. These embodiments use monomode fiber which is operated with carrier light at a frequency which causes the fiber to support two modes. Referring to FIG. 21 there is shown a spatial distribution of the even and odd modes of a monomode fiber when operated in the two mode region. FIG. 21(a) shows the even mode which has a bell shaped intensity distribution curve which is symmetrical about the core center. FIG. 21(b) shows the odd mode wherein there are peaks of intensity of oppositely polarized light on each side of the core center and zero intensity in the middle. FIG. 21(c) shows the shape of the light beam which emerge from the even mode, and FIG. 21(d) shows the shape of the beams emerging from the odd mode. FIG. 21(e) shows the resultant beam shape when the two modal beams are combined.

Figure 22:
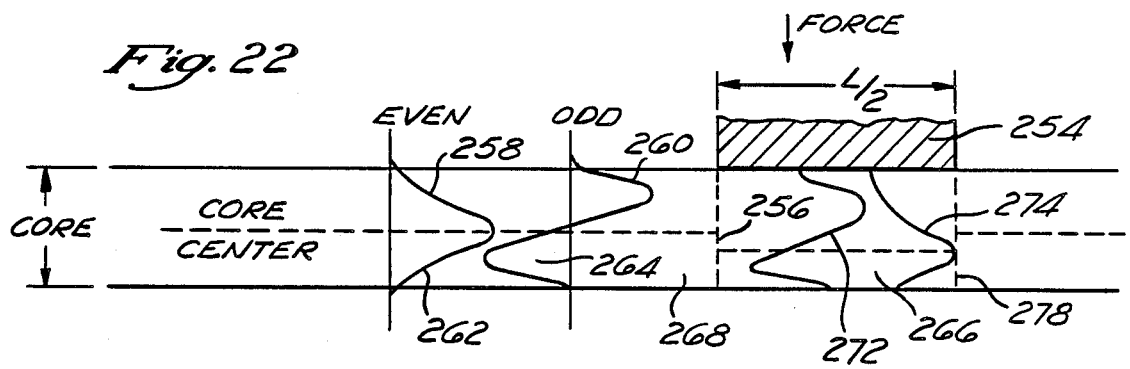
FIG. 22 shows how coupling between the even and odd modes of a two mode fiber can occur in a stressed region.

Referring to FIG. 22 there is shown a drawing illustrating how coupling between the even and odd modes of a two mode fiber can occur in a stressed region. A ridge 254 of width L/2 exerts distributed stress over a region 266 of a fiber, deforming the fiber slightly and offsetting the fiber centerline of the core at the location 256. At points to the left of the location 256, there is radial symmetry in the fiber around the centerline such that any power coupled between the even and odd modes in one portion of the fiber is cancelled by power of the opposite polarity coupled on the opposite side of the fiber. That is, power coupled between the odd and even modes on the side of regions 258 and 260 will be balanced and cancelled by power coupled between the even and odd modes on the side of regions 262 and 264. In other words when the two functions are multiplied by each other and the product is integrated over the core region, the total coupled power in the unstressed region is zero because of the radial symmetry.

Figure 23:
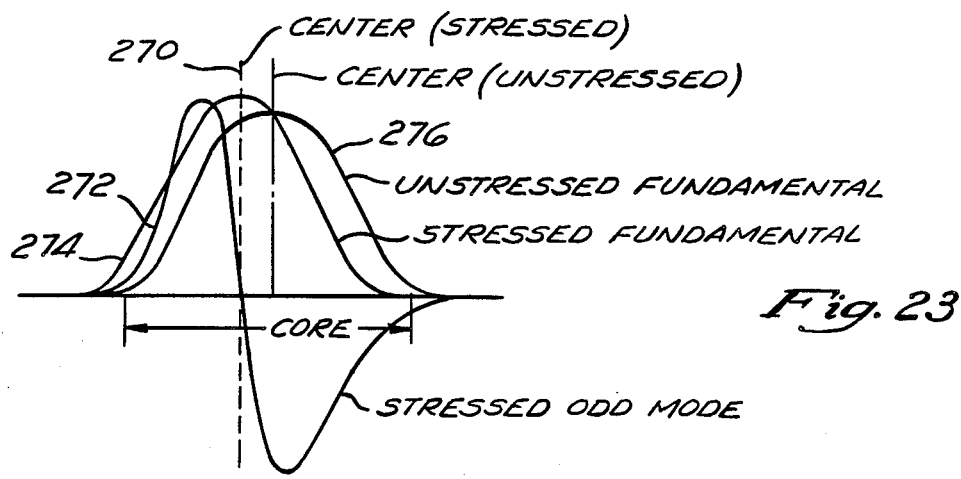
FIG. 23 shows the mechanism for the even mode unstressed region power breakup into the stressed region odd and even modes.

In the stressed region 266, the situation is as represented in FIG. 22 to the right of the perturbation at the location 256 and as shown in FIG. 23. FIG. 23 illustrates the mechanism for the breakup of the even mode unstressed power distribution into two components in the odd mode and even modes in the stressed region. The odd mode in the unstressed region 268 is shown only for illustration as there is no power in it if the ridge 254 provides the first stressed region encountered by the light. The dislocation at the boundary 256 has the effect of shifting the midpoint of the modes in the stressed region to the left. The stressed region odd mode is represented by the curve 272, and the stressed region even mode, is represented by the curve 274.

At the boundary 256 energy and polarization must be conserved by Maxwell's equations. Therefore all the power that is launched into the unstressed even mode 276 to the left of the boundary 256 must also be present on the other, stressed side of the boundary (i.e. in the stressed even and odd modes) so that the total power remains the same, less radiation losses. Further, the overall polarization vector on either side of the boundary 256 must be the same. However, since the fiber is no longer radially symmetrical, in the stressed region 266, there must be some power transfer or coupling from the unstressed even mode 276 to the stressed odd mode 272 to satisfy the above conditions. Thus, the stressed region 266, there will be optical power in both the even mode 274 and the odd mode 272. Coupling between two modes is a function of overlap of the electric field vectors in accordance with Maxwell's equations. Since the two even modes 276 and 274 on either side of the boundary 256 do not completely overlap, incomplete coupling between the two even modes results. The uncoupled energy must go somewhere by the law of conservation of energy. By taking the product of the even function 276 times the stressed region even and odd functions 274 and 272 respectively and integrating over the core surface, it is seen that most of the remaining energy must be coupled into the stressed region odd mode to conserve energy across the boundary and preserve the electric field vector on both sides. The during such coupling some energy may be lost as radiated energy. The light then propagates through the stressed region 266, in both the even and odd modes, for half a beat length at the respective velocities for the even and odd modes.

Upon reaching the boundary 278 between the stressed and unstressed regions, the centerline shifts back to radial symmetry and more power is transferred into the odd mode to again satisfy the boundary conditions. A frequency shift can be achieved by adding other ridges like the ridge 254 and spacing them as previously described as well as driving them with individual driving signals phased as previously described.

Figure 24:
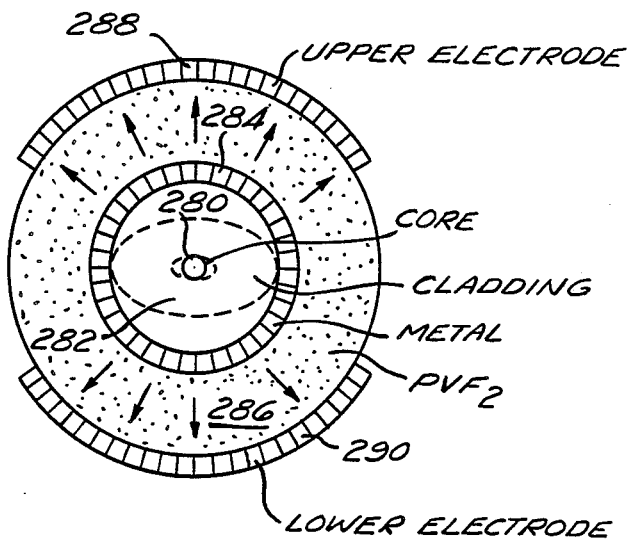
FIG. 24 shows an end view cross section for the embodiment of FIG. 14 for a fiber optic frequency shifter using a PZT coated fiber.

FIG. 24 shows a cross section of the embodiment of a frequency shifter using a piezoelectric coated fiber. The embodiment of FIG. 24 is similar to the embodiment of FIG. 14 except that it uses single crystal monomode fiber or multimode fiber. The fiber core 280 is surround by a cladding 282. The fiber cladding is then coated with a metal layer 284 by standard electrodeposition sputtering techniques. The metal coated fiber is then pulled through a melt of piezoelectric material such as $PVF_2$ to create a $PVF_2$ jacket 286. The dipoles of the jacket 286 are lined up radially as symbolized by the arrows in the radial direction using techniques which are well known in the art. Two electrodes 288 and 290 are then formed on the jacket 286 by well known sputtering and etching techniques or any other suitable technique. The electrodes 288 and 290 can then be driven with sinusoidal modulating signals with respect to the metal layer 284 to squeeze the core and cladding. The driving signals should be in equal magnitude so as to asymmetrically deform the fiber to shift the centerline of the fiber. The electrode structure 288 and 290 should be periodic as previously described in FIG. 14 and the modulating signals for each pair should be appropriately phased as previously described to simulate or launch a travelling acoustic wave. Preferably a piezoelectric material for the jacket 286 will be used which is hard enough and which exerts enough stress on the fiber to cause significant shifts in the optical properties of the fiber at each boundary.

Figure 25:
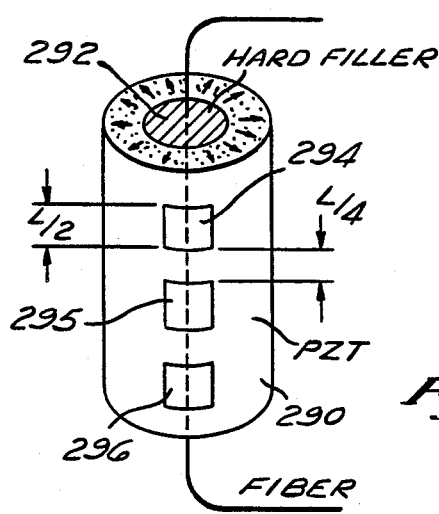
FIG. 25 shows another embodiment for an fiber optic frequency shifter using a piezoelectric cylinder surrounding the fiber.

FIG. 25 shows a modified version of the embodiment of FIG. 24. A PZT cylinder 290 with a hollow core is formed. The PZT has a cut which aligns the poles of the PZT radially. The hollow core is filled with a material 292, such as epoxy, which hardens to as hard or harder than the fiber material. A periodic structure of electrodes such as the electrodes 294–296 are then formed on the outside of the PZT cylinder with dimensions and spacing as previously described. These electrodes cause the PZT to squeeze the birefringent fiber in the regions just below the electrodes to shift the centerline of the fiber of the axes of birefringence. This embodiment allows the use of PZT which has a gain size almost as large as the fiber itself. This grain size makes PZT unsuitable for use in the embodiment of FIG. 24 because of the non-uniformity of stress that these grains would produce. The fiber must be metal coated or the inside of the PZT cylinder must have a metal lining to provide a ground for the electrodes 294–296.

Figure 26:
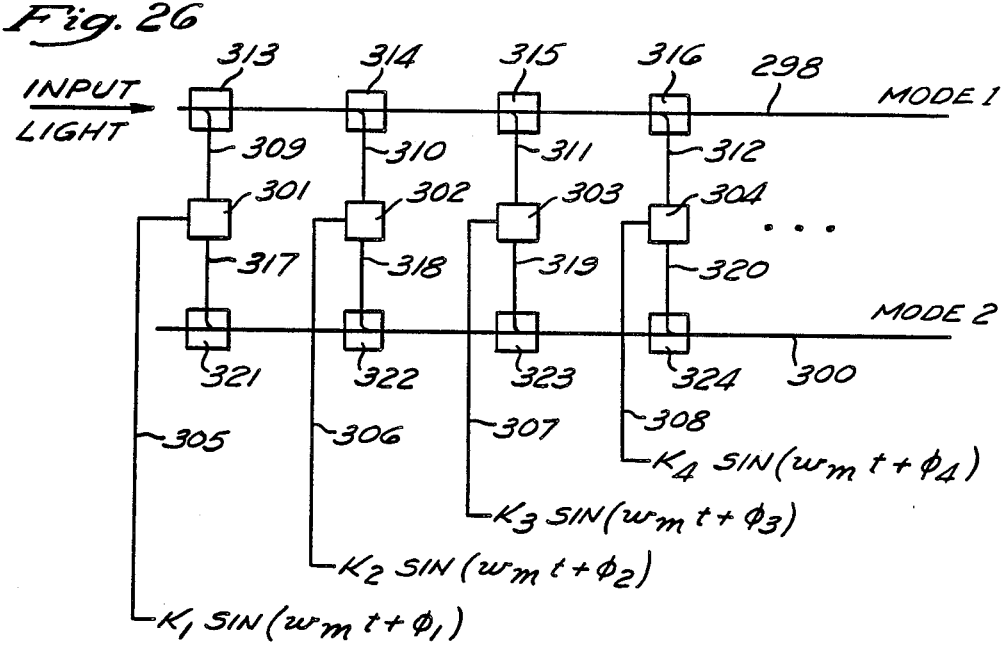
FIG. 26 shows the preferred general embodiment for a fiber optic frequency shifter.

Referring to FIG. 26, there is shown the general preferred embodiment for a fiber optic frequency shifter. This embodiment is comprised to two dissimilar wave guides 298 and 300 having different indices of refraction. These two waveguides 298,300 may comprise any structure which provides two respective optical paths; for example the waveguides may comprise two separate monomode fibers having different indexes of refraction, or two orthogonal polarization modes within a single conventional fiber. Further, they could be two modes of a multimode fiber or the two modes of a monomode fiber operated in the two mode regime. A plurality of distributed coupling elements 301–304 couple the first waveguide 298 to the second waveguide 300 at predetermined coupling points or locations along the waveguides. The coupling elements 301–304 are non-linear devices which control the coupling between the optical paths 298,300 in accordance with predetermined non-linear transfer or coupling functions, which are preferably sinusoidal. Thus, the elements 301–304 serve as mixers which multiplex two input signals, namely, a modulating signal which is input on one of the lies 305–308, and the light carrier signal which is input on one of the waveguides 309–312. Couplers 313–316 serve to guide and provide path 1 light energy to the mixers 301–304 for multiplication by the modulating signal. The output signals from the mixers 301–304 on the waveguides 317–320 are coupled into the second waveguide or path 2 by a plurality of couplers 321–324. These couplers may be fiber optic directional couplers or polarization couplers having boundaries between stressed and unstressed regions in the fibers as previously described herein. It will be recognized that the multiplication of the modulating signal times the input light in path 1 produces an output signal in the waveguides 317–320 which contain a number of terms including an upper and a lower sideband. Typically, it is desirable to provide only one sideband which is shifted in frequency by an amount which is equal to the modulation frequency. Elimination of the undesired second sideband is accomplished by phasing the driving signals appropriately such that the outputs signals on the waveguides 317–320 add constructively in the second waveguide only at the desired sideband frequency and add destructively at the undesired sideband frequency.

The couplers 313–316 may be fiber optic directional couplers such as are described in U.S. patent application Ser. No. 139,511, filed Apr. 14, 1980, now U.S. Pat. No. 4,493,528, and U.S. patent application Ser. No. 300,955, now U.S. Pat. No. 4,536,058 filed Sept. 10, 1981, which are hereby incorporated by reference. Such couplers are also described in a paper by R. A. Bergh, G. Kotler and H. J. Shaw entitled "Single Mode Fiber Optic Directional Coupler" published in Electronics Letters on Mar. 27, 1980, Vol. 16, No. 7 at pp 260–261.

The mixers 301–304 could be any nonlinear device or region in a single fiber embodiment. For example, the mixers could be lithium niobate crystals with the modulating signals on the lines 305–308 applied through electrodes on the crystals to sinusoidally vary the birefringence in the mixers 301–304. This shifting of the axes of birefringence in the mixers 301–304 causes coupling between two modes in the crystal by the electrooptic effect. By inputting the light from the waveguides 309–312 to one mode in the crystal, and outputting light to waveguides 317–320, respectively, from the other mode of the crystal, the power transferred from the waveguides 309–312 to the waveguides 317, 320, respectively, may be controlled. Thus, the mixers 301–304 function to control coupling between the paths 1 and 2 of the waveguides 298,300, respectively, in accordance with a predetermined coupling function represented by the modulating signals.

Alternatively, the mixers 301–304 could be boundaries or coupling regions between stressed or unstressed regions in birefringent monomode fibers, or two mode nonbirefringent fibers, as previously discussed herein.

The mixers 301–304 could also be bulk wave single sideband modulators. Such an embodiment would not be as advantageous as other embodiments discussed herein because of the introduction of bulk wave components into an otherwise fiber system.

The mixers 301–304 should each have an ability to respond to driving signals so as to control both the frequency of oscillation of coupling between the optical paths as well as its positive and negative limits. That is, the mixers 301–304 should be able to respond to driving signals of the form $k \sin(\omega_m t + \phi)$. The response should be the coupling of a sinusoidally varying amount of power between the waveguides 309–312 and 317–320, respectively, with the coupling function varying at the frequency $\omega_m$. In this way the coefficient K for each mixer can be varied to set the maximum and minimum of the sinusoidal coupling function, and the phase difference $\phi$ between each driving signal can be varied to simulate a moving acoustic wave.

Figure 27:
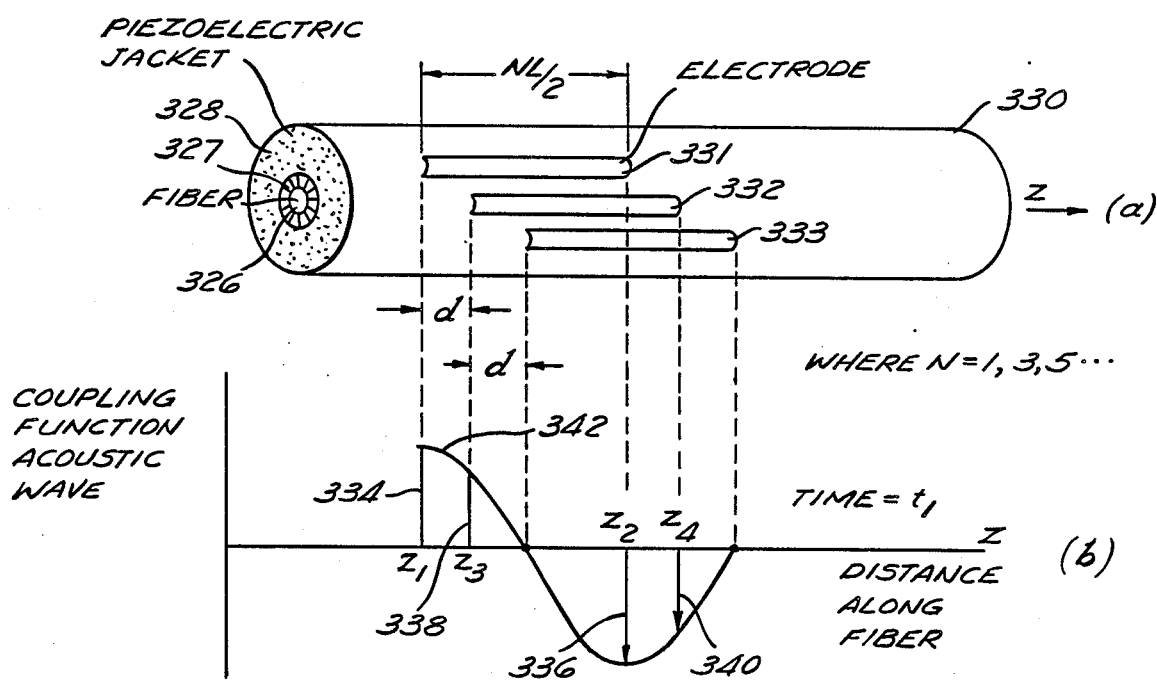
FIG. 27 shows another embodiment for a fiber optic frequency shifter using a piezoelectric jacket and staggered electrodes.

FIG. 27(a) shows another embodiment of a fiber optic frequency shifter using a piezoelectric jacket. A fiber 326 is surrounded by a metal layer 327 and a cylindrical piezoelectric jacket 328 which has its dipoles aligned radially such that an electric field applied diagonally through the piezoelectric jacket will cause radial expansion and contraction of the fiber. The metal layer 327 and the jacket 328 can be formed by methods discussed above.

The piezoelectric jacket 328 can be any piezoelectric material but $PVF_2$ is preferred since it is easier to apply. The $PVF_2$ can be applied by drawing the fiber through a melt of $PVF_2$ compound. The polling to align the dipoles of the $PVF_2$ can be done by forming the jacket 328 around the center electrode 327 and then forming a solid metal electrode around the outer perimeter of the jacket 328 and applying a large voltage between the two electrodes. Heating the solidified $PVF_2$ slightly during application of the voltage improves the result.

The fiber 326 can be a birefringent, single mode fiber, a multimode fiber, a monomode, non-birefringent fiber operated in the two mode region or any other fiber where physical stress will cause coupling of power between two modes with different indices of refraction.

The piezoelectric jacket 328 has a plurality of strip electrodes 331-333 formed on the outer surface 330 of the cylinder. Each electrode is made of any conductive material and is an odd multiple of one half beat length long. Although only three electrodes are shown in FIG. 27(a), many more electrodes can be formed on the surface of the piezoelectric cylinder 328. In fact it is preferable to form as many electrodes as possible on the surface of the piezoelectric cylinder.

The electrodes 331-333 are staggered around the surface 330 of the piezoelectric jacket such that each electrode starts a distance, d, further down the longitudinal or z axis of the jacket 328. The distance, d, can be set at any arbitrary value. Each electrode 331-333 has a diagonally opposite counterpart (not shown) formed on the opposite side of the jacket 328. The electrodes 331-333 can be formed by any conventional technique such as by coating the entire surface of the jacket with metal and etching away excess metal to define the individual electrodes. This can be done by drawing photoresist areas on the solid metal layer and dipping the fiber and jacket into an acid to do selective etching.

Referring to FIG. 27(b), the manner of operation of the device shown in FIG. 27(a) will be explained. Each electrode formed on the piezoelectric jacket 328 is an odd multiple of one half beat length long and starts a distance, d, from its next preceding neighbor. If respective sinusoidal driving signals is applied to the electrodes 331-333, such that there is a phase difference equal to $d2\pi/L$, between the driving signals of adjacent electrodes (e.g. between electrodes 331 and 332 and between electrodes 332 and 333), a unidirectional, sinusoidally varying, travelling acoustic wave will be launched in the fiber. Other phase relationships will simulate other travelling acoustic waves in both directions.

The arrows 334 and 336 represent the amplitude and sign of the coupling caused by the electrode 331 and its opposite counterpart (not shown) at a time $t_1$, at the locations $Z_1$, and $Z_2$. The arrows 338 and 340 represent the amplitude and sign of the coupling at the locations $Z_3$ and $Z_4$ at the time $t_1$, caused by the electrode 332 providing its driving signal is phased as described above relative to the driving signal for the electrode 331. At a time $t_2$ later, the simulated or actual acoustic wave 342 will have moved to the right, and the magnitude of the coupling at each location will shift accordingly.

The advantage of the embodiment of FIG. 27(a) is that a coupling function having many coupling elements located within one beat length can be implemented. In fact, as many sampling or coupling points as space permits are possible. This results in fewer harmonics in the output and a more narrow bandwidth which is desirable in some applications.

The above described embodiments utilizing electrodes and piezoelectric jackets could also achieve a frequency shift utilizing single crystal fibers. In these embodiments, the electrodes could be placed directly on the fiber and electroptical effects in the crystal structure below each electrode could be used to cause coupling between modes in the fiber. The size and spacing of the electrodes is the same as described in each embodiment and the phase relationship between the driving signals for the electrodes is as described for each embodiment.

Figure 28:
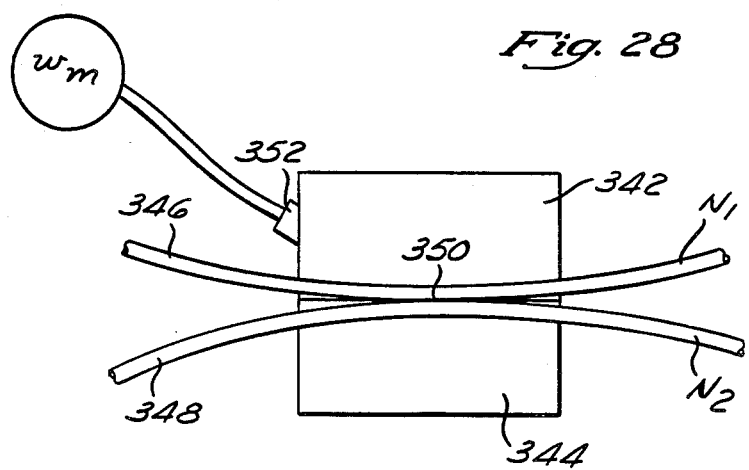
FIG. 28 shows an embodiment of a fiber optic switch and frequency shifter utilizing two half couplers.

Another embodiment of fiber optic frequency shifter is shown in FIG. 28. This device comprises a coupler of the type described in the Bergh et al., paper and the patent application entitled "FIBER OPTIC DIRECTIONAL COUPLER", which were incorporated by reference, above. The coupler comprises two fibers 346 and 348, which are mounted in blocks 342 and 348, respectively. A portion of the cladding is removed from one side of each of the fibers to form respective oval surfaces which are positioned together to form an interaction region 350. In the embodiment shown, the fibers 346, 348 have dissimilar indices of refraction $N_1$, $N_2$, respectively. The indices of refraction $N_1$ and $N_2$, and the length of the effective interaction region are selected such that the effective interaction length is equal to one beat length of the light propagating in the two dissimilar wave guides 346, 348 (or integral multiples thereof). Such matching of the beat length to the effective interaction length results in no coupling between the fibers 346, 348 in the absence of an acoustic wave. Thus, if light is input into the fiber 346, all of the light will exit the fiber 346 with no light being coupled to the fiber 348. However, if an acoustic wave is launched to propagate longitudinally along the fibers through the interaction region, the acoustic wave will cause coupling of light from one fiber e.g. the fiber 346 to the other fiber e.g. the fiber 348. Further, such coupled light will be shifted in frequency by an amount equal to the acoustic frequency, due to the heterodyning effect discussed previously. As with the previously discussed embodiments, the wavelength of the acoustic wave should be equal to the beat length between the light in the fibers for optimum results. The acoustic wave may, for example, be launched as a bulk wave by a transducer 352 mounted on one of the coupler blocks 342, 344. Alternatively, the acoustic wave may be launched into one of the fibers, e.g. the fiber 348, for propagation through the interaction region 350.

Figure 29:
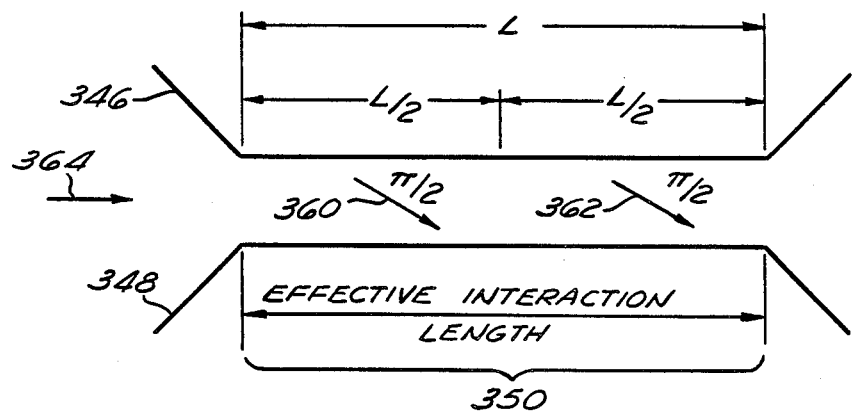
FIG. 29 is a schematic drawing illustrating coupling in the coupler of FIG. 28.

The foregoing may be more fully understood through reference to FIG. 29, which schematically shows the coupler of FIG. 28. For the purposes of discussion, it will be assumed initially that light is input to the left end of the fiber 346, and that no acoustic wave is present. During traverse of the first half beat length of the effective interaction length by the input light, a fraction of optical power, represented by the arrow 360 will be coupled from the fiber 346 to the fiber 348. Similarly, a fraction of optical power, represented by the arrow 362, will be coupled from the fiber 346 to the fiber 348 during the second half beat length. As is well known, during such coupling from one fiber to the other, the coupled light gains 90 degrees in phase. Thus, assuming that the fiber 348 has a higher propagation velocity than the fiber 346, the light coupled during the first half beat length will accumulate a phase of 270 degrees relative to the light in the fiber 346 by the time it reaches the center of the interaction region 350. Light coupled from the fiber 346 to the fiber 348 during the second half beat length will destructively interfere with the light coupled during the first half beat length, resulting in a transfer of optical energy from the fiber 348 to the fiber 346. This occurs because, by the time the light coupled during the first half beat length propagates to the end of the interaction region 350, it's total accumulated phase will be 350 degrees, while the light coupled during the second half beat length will have a total accumulated phase of 270 degrees at the end of the interaction region 350, which yields a phase difference of 180 degrees. Such phase difference results in total destructive interference, causing the light to transfer from the fiber 348 back to the fiber 346, due to the law of conservation of energy. Thus, so long as the effective interaction length of the region 350 is equal to 1 beat length (or an integral multiple thereof), no light will be transferred from the fiber 346 to the fiber 348.

The acoustic wave launched by the transducer 352, represented in FIG. 29 by the arrow 364 causes a change in the index of refraction which alters the fiber modes slightly, resulting in a different degree of evanescent field overlap and field strength in the fiber 348 by the input light from the fiber 346. This changes the coupling in the two half beat lengths and upsets the previously described balance, resulting in a net power transfer between the two fibers. As described previously, the transferred power will be shifted in frequency by an amount equal to the acoustic frequency, assuming that the wavelength of the acoustic wave is properly matched to equal one beat length.

Those skilled in the art will understand that the embodiment of FIG. 29, as well as the other, previously described embodiments may also be used as a fiber optic switch.

All the devices described herein have a bandwidth around the optimal coupling optical frequency. The optimal frequency will be that frequency of input light which has a beat length matched to the wavelength of the modulating acoustic wave or apparent acoustic wave. For optical frequencies different from this optimal frequency and for modulating frequencies different from the above matching criteria the performance will fall off. The bandwidth will also be inversely proportional to the number of sampling points used.

The number of harmonics generated will vary depending upon how many sampling points there are in the coupling function within a given beat length. More sampling points yields fewer harmonics.

Although the invention has been described in terms of the embodiments described herein, many modifications will be apparent to those skilled in the art. All such modifications are intended to be included within the scope of the claims appended hereto.

What is claimed is:

1. A fiber optic frequency shifter, comprising:
   a single optical fiber for guiding light having a wavelength, said fiber having two predetermined modes of propagation, each of said modes having a different propagation velocity, said fiber having a beat length for said two predetermined modes at said wavelength of said light;
   a member in contact with said single fiber; and
   a generator connected to drive said member to apply force to said fiber to produce a traveling stress wave in said fiber such that said traveling stress wave propagates longitudinally along a continuous length of said single fiber with a predetermined wavelength, said continuous length comprising plural beat lengths of said fiber, the predetermined wavelength of said traveling stress wave selected in accordance with the beat length for said two predetermined modes of said fiber to cause cumulative coupling of light from one of said modes to the other of said modes through said plural beat lengths, said traveling stress wave interacting with the light to cause the coupled light to be shifted in frequency.

2. A fiber optic frequency shifter, comprising:
   an optical fiber for propagating an optical signal;
   a member in contact with said fiber; and
   a generator which drives said member to apply force to said fiber to produce a traveling stress wave in said fiber such that said traveling stress wave propagates axially along a continuous length of said fiber, said traveling stress wave having a propagation velocity and a periodicity selected to cause said stress to interact with said optical signal to frequency shift said optical signal without coupling said optical signal out of said fiber.

3. A method of frequency shifting, comprising:
   introducing an optical signal into an optical fiber;
   driving a member in contact with said fiber such that a traveling stress propagates axially along a continuous length of said fiber, said stress interacting with said optical signal along said length of said fiber to cause said frequency shifting; and
   guiding said optical signal within said fiber during said interacting of said stress and said optical signal to prevent said optical fiber from escaping said fiber.

* * * * *